(12) United States Patent
Hsu et al.

(10) Patent No.: US 8,408,092 B2
(45) Date of Patent: Apr. 2, 2013

(54) SAFETY DEVICE ON STEERING HANDLE

(75) Inventors: Mau-Pin Hsu, Taipei (TW); Hsin-Wei Su, Taipei (TW); Chih-Hao Wang, Taipei (TW); Ruei-Fu Wang, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 242 days.

(21) Appl. No.: 12/843,866

(22) Filed: Jul. 26, 2010

(65) Prior Publication Data

US 2011/0154942 A1 Jun. 30, 2011

(30) Foreign Application Priority Data

Dec. 30, 2009 (TW) ................ 98145957 A

(51) Int. Cl.
*B62K 21/12* (2006.01)

(52) U.S. Cl. ...................................... 74/551.1

(58) Field of Classification Search ............... 74/551.1, 74/551.3; 280/263, 270, 293, 777
See application file for complete search history.

(56) References Cited

U.S. PATENT DOCUMENTS 5,271,635 A * 12/1993 Lu .................... 280/275
5,509,676 A * 4/1996 Fukutake et al. ......... 280/276
2003/0047903 A1 3/2003 Hasegawa
2005/0151341 A1 7/2005 Iwamoto

FOREIGN PATENT DOCUMENTS

| JP | 198094 | 6/1989 |
| JP | 08198159 | 8/1996 |
| JP | 2008207718 A | 9/2008 |
| TW | 550204 B | 9/2003 |
| TW | 200831343 A | 8/2008 |

* cited by examiner

*Primary Examiner* — Vicky Johnson

(57) ABSTRACT

Disclosed is a safety device on a steering handle, capable of controlling a direction-control wheel of a wheeled vehicle. The handlebar is engaged with the head part by its mortise with a tenon of the head part. When an outer bar end of the handlebar is hit, an inner tube of the handlebar will be pushed to disengage the mortise and the tenon to rotate the handlebar along. Alternatively, paired washers with wedge-shaped teeth can be utilized to engage the handlebar with the head part. When the outer bar end is hit, the washers are disengaged to allow the handlebar to rotate. Moreover, a hydraulic system or an inserting rod with a chassis groove system can be employed to maintain the original direction of the direction-control wheel when the handlebar is hit. Therefore, a sudden turn of the direction-control wheel and an fall-over of the rider and the vehicle can be prevented.

10 Claims, 26 Drawing Sheets

SAFETY DEVICE ON STEERING HANDLE

BACKGROUND OF THE INVENTION

1. Claim of Priority

This application claims priority to Taiwanese Patent Application No. 098145957 filed on Dec. 30, 2009.

2. Field of the Invention

The present invention generally relates to a safety device on a steering handle, and more particularly to a safety device on a steering handle of a wheeled vehicle to prevent from losing control of the wheeled vehicle cause of being sideswiped by other vehicles.

3. Description of Prior Art

Taiwan is small in area but densely populated. Particularly in a metropolis, a wheeled vehicle, such as motorcycle is a major means of transportation for a lot of people. Besides, for other many people, bicycles are their major transportation tools. In such a heavy traffic condition in a metropolis, one of the most common traffic accidents is the sideswiping condition and the fall-over result therefrom. Under such a accidental and unexpected situation and due to a lack of time to react, once the steering handle of the wheeled vehicle is sideswiped or hit by another vehicle at the outer end of the handlebar, it may lead to an immediate sharp turn of the direction-control wheel controlled by the steering handle and results in an fall-over of the rider as well as the wheeled vehicle. If the other vehicles (such as cars, buses or trucks) right behind the involved vehicles cannot respond in time, some casualties may result.

As far as vehicles with a steering handle are concerned, no matter they are two-wheeled, three-wheeled, or four-wheeled vehicles, none of them on the market are equipped with such a safety device to prevent riders from fall-over caused by sideswiping. Every time a person involved in such a traffic accident, it might result in a tragedy for the entire family.

SUMMARY OF THE INVENTION

An objective of the present invention is to provide a safety device on a steering handle to rotate a handlebar as the outer end of the handlebar is hit by an external force to prevent a sudden turn of the direction-control wheel and an fall-over of the rider and the wheeled vehicle.

The safety device on the steering handle of the present invention comprises a head part, a handlebar and a buffer assembly. The head part is connected with a chassis of the vehicle. The handlebar is joined to the head part for controlling the direction-control wheel. The buffer assembly rotates the handlebar under the influence of an external impact force and makes the direction-control wheel maintain its original direction as the handlebar is hit by the external force.

The safety device on the steering handle of the present invention comprises a tenon positioned on the head part. The handlebar comprises an outer bar and an inner tube. The handlebar is joined to the head part by the tenon. Moreover, the buffer assembly of the present invention comprises a balance terminal, a front guard and a rear guard. The balance terminal is positioned at another end of the outer bar which is joined to the head part. Meanwhile, the balance terminal is joined to the outer bar with a bolt. The front guard is positioned in front of the handlebar. One end of the front guard is joined to the balance terminal. The rear guard is positioned in the back of the handlebar. One end of the rear guard is also joined to the balance terminal. The other ends of the front guard and the rear guard are both joined to the head part with a bolt. As the balance terminal is hit, it pushes the inner tube to disengage the tenon from the handlebar and the handlebar can be rotated along.

Furthermore, the safety device on the steering handle of the present invention can comprise a first washer with wedge-shaped teeth and a second washer with wedge-shaped teeth. The first washer with wedge-shaped teeth is placed at the head part and the second washer with wedge-shaped teeth is placed at one end of the handlebar. The first and second washers are connected with each other by respective wedge-shaped teeth and by a screw bolt. The connection of the respective wedge-shaped teeth is disengaged to allow the handlebar to rotate as the other end of the handlebar is hit. Furthermore, the safety device on the steering handle further comprises a spring washer for fixing the connection of the respective wedge-shaped teeth of the first and second washers. The spring washer recovers the connection of the respective wedge-shaped teeth when the external force disappears after the handlebar is hit.

The buffer assembly of the present invention further comprises a direction-maintaining mechanism. The direction-maintaining mechanism can be utilized to instantly maintain the original direction of the direction-control wheel as the balance terminal is hit. The direction-maintaining mechanism can be a hydraulic system. Alternatively, the buffer assembly of the present invention can include another kind of direction-maintaining mechanism which has a chassis groove system, a frustum and an inserting rod. As the balance terminal is hit, the inner tube pushes the frustum and then the inserting rod inserts into one of the grooves. The original direction of the direction-control wheel can be maintained for a very short period of time as required.

DETAILED DESCRIPTION OF THE INVENTION

Figure 1:
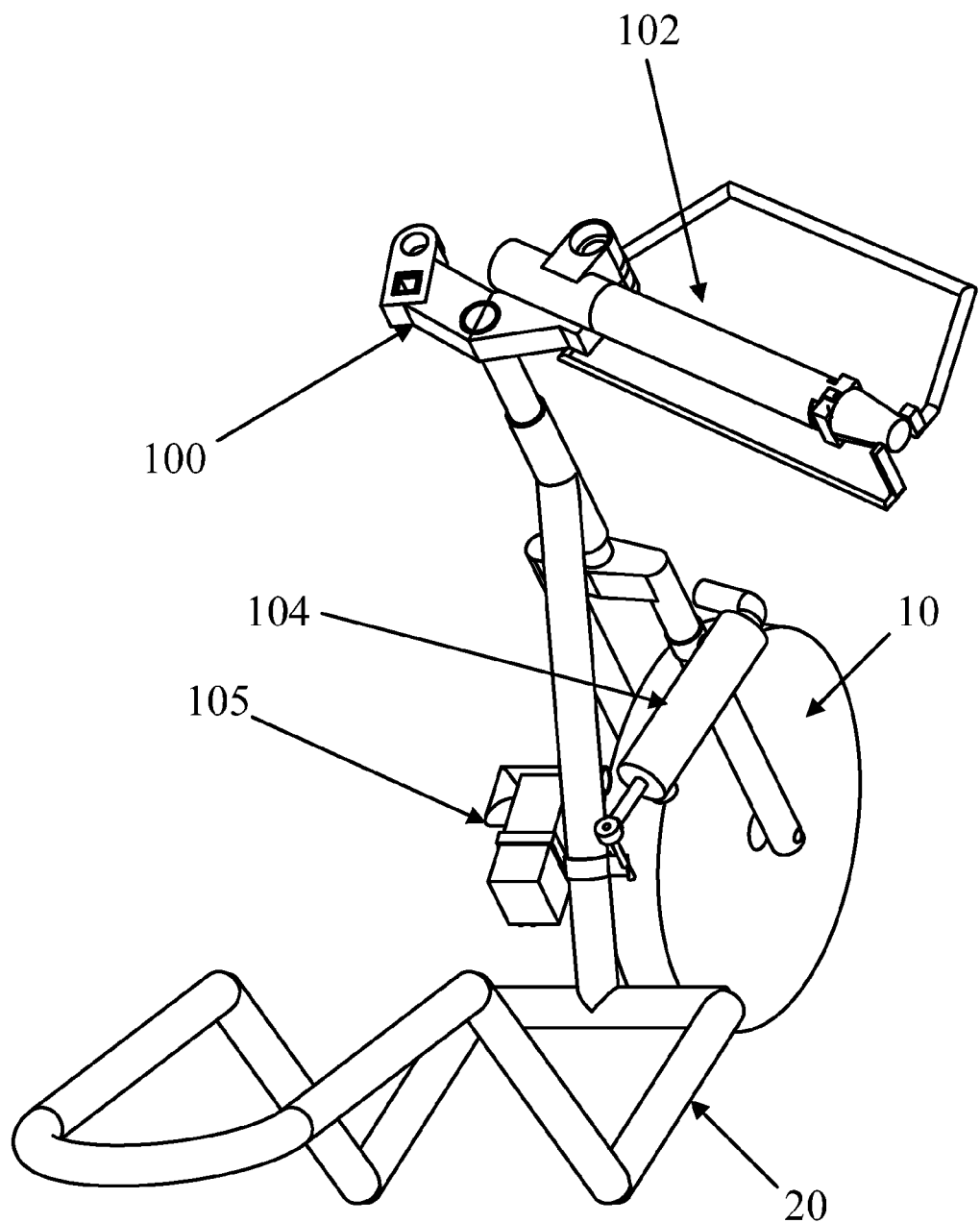
FIG. 1 depicts an overall diagram of a safety device on a steering handle of the first embodiment according to the present invention.
Figure 2:
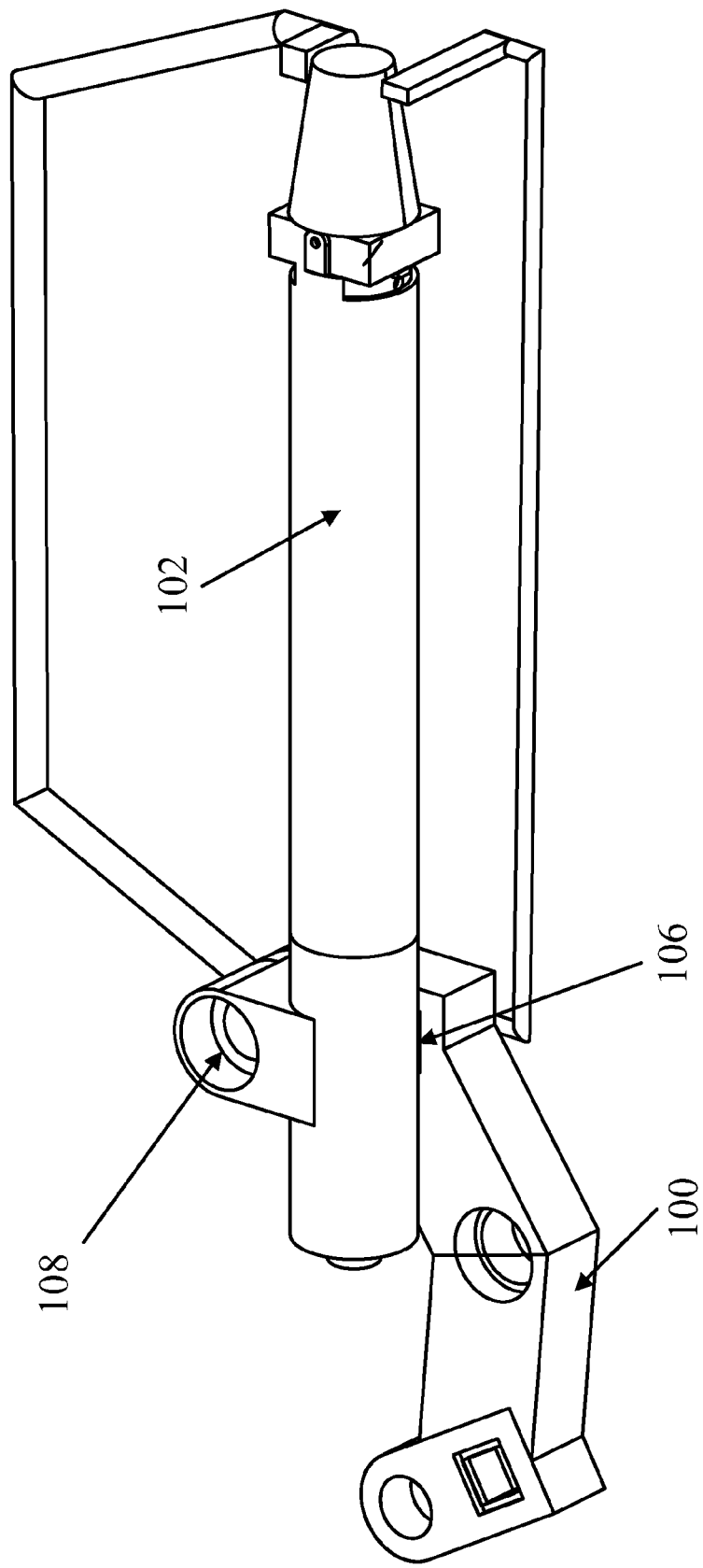
FIG. 2 depicts an assembly diagram showing a head part and a handlebar section of the first embodiment according to the present invention.
Figure 3:
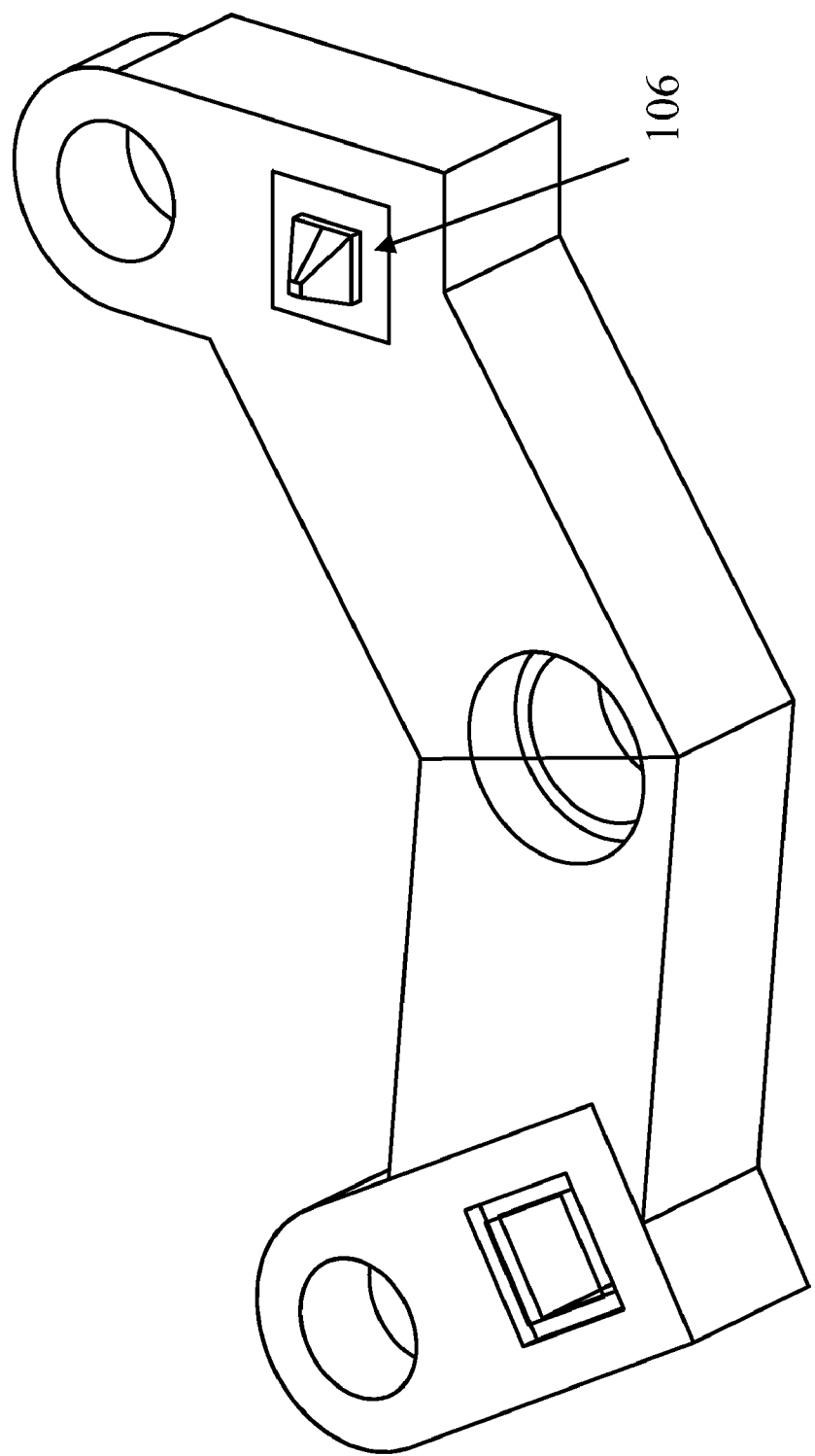
FIG. 3 depicts a diagram of the head part and a tenon positioned on the head part of the first embodiment according to the present invention.
Figure 4:
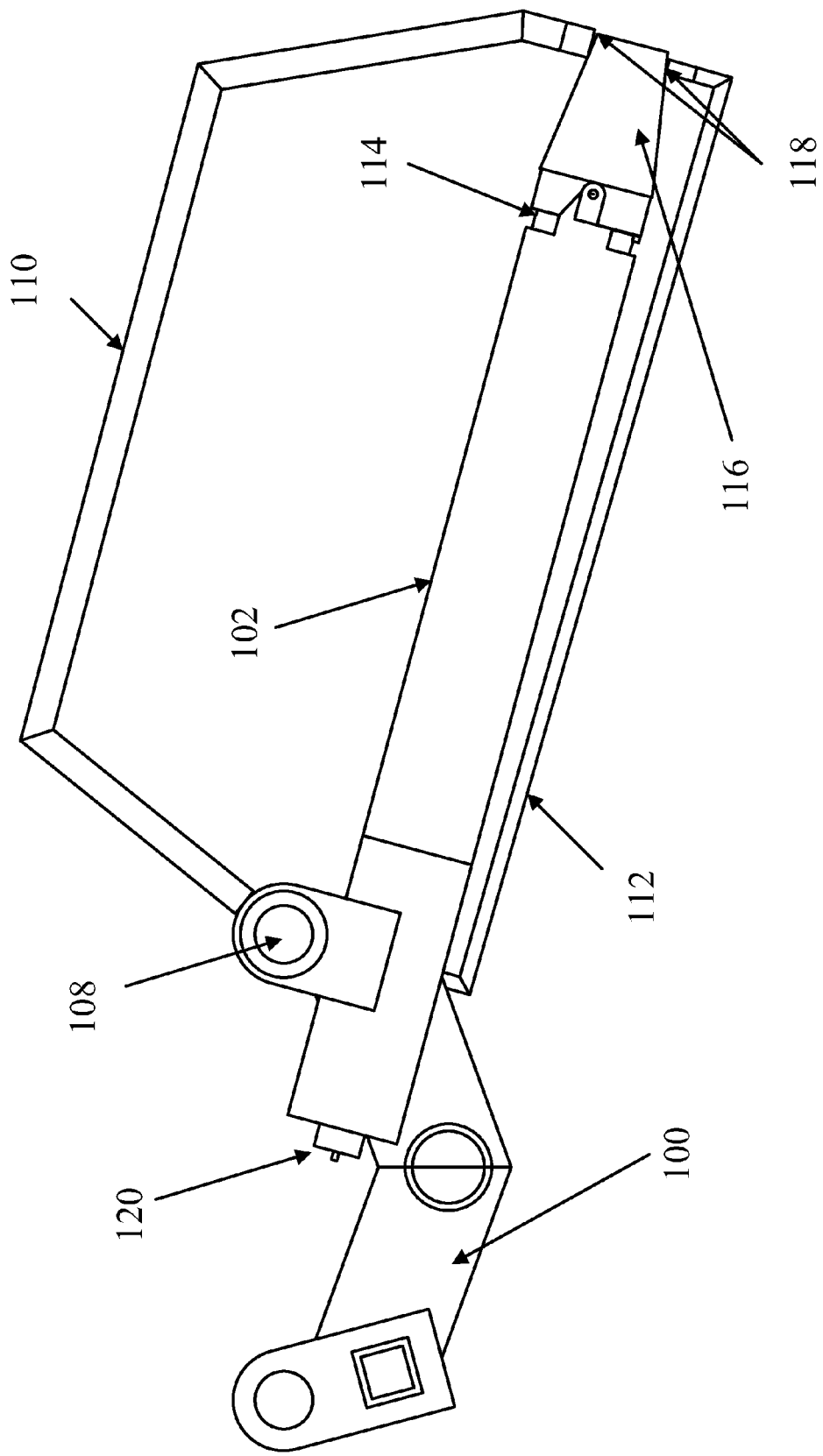
FIG. 4 depicts a top view assembly diagram of the head part and handlebar of the first embodiment according to the present invention.

Please refer to FIG. 1 to FIG. 4. FIG. 1 depicts an overall diagram of a safety device on a steering handle of the first embodiment according to the present invention. FIG. 2 depicts an assembly diagram showing a head part 100 and a handlebar section of the first embodiment according to the present invention. FIG. 3 depicts a diagram of the head part 100 and a tenon 106 positioned on the head part of the first embodiment according to the present invention. FIG. 4 depicts a top view assembly diagram of the head part and the handlebar of the first embodiment according to the present invention. Here, the steering handle represents the handling section of the wheeled vehicle, generally, including the head part, the handlebar and related components.

In the first embodiment of the present invention, the safety device on the steering handle comprises a head part 100, a handlebar and a buffer assembly. The buffer assembly of the present invention comprises a front guard 110, a rear guard 112, a balance terminal 116 and a hydraulic system. As shown in FIG. 1, the hydraulic system, employed as a direction maintaining mechanism comprises a hydraulic cylinder 104 and an electrical hydraulic valve 105. As shown in FIG. 3, the head part 100 comprises a tenon 106. As shown in FIG. 4, the handlebar comprises an outer bar 102 and an inner tube 114. The head part 100 and the outer bar 102 are joined by the tenon 106. The front guard 110 and the rear guard 112 are positioned in front of the handlebar and behind the handlebar respectively. Meanwhile, the front guard 110 and the rear guard 112 are both joined to the head part 100 with a bolt 108. As shown in FIG. 2 and FIG. 4, the balance terminal 116 is positioned at the other end of the outer bar 102 which is joined to the head part 100. The balance terminal 116 comprises a slide slot 118 for jointing the ends of the front guard 110 and the rear guard 112. Moreover, as shown in FIG. 4, the hydraulic system of the present invention comprises an electrical switch 120 positioned at the end of the handlebar which is joined to the head part 100. The electrical switch 120 can be pushed and triggered by the inner tube 114. The hydraulic system is capable of maintaining the original direction of the direction-control wheel 10 at the moment when the handlebar is hit by an external force. In this way, a possible fall-over of the rider and the wheeled vehicle could be prevented.

Figure 5A:
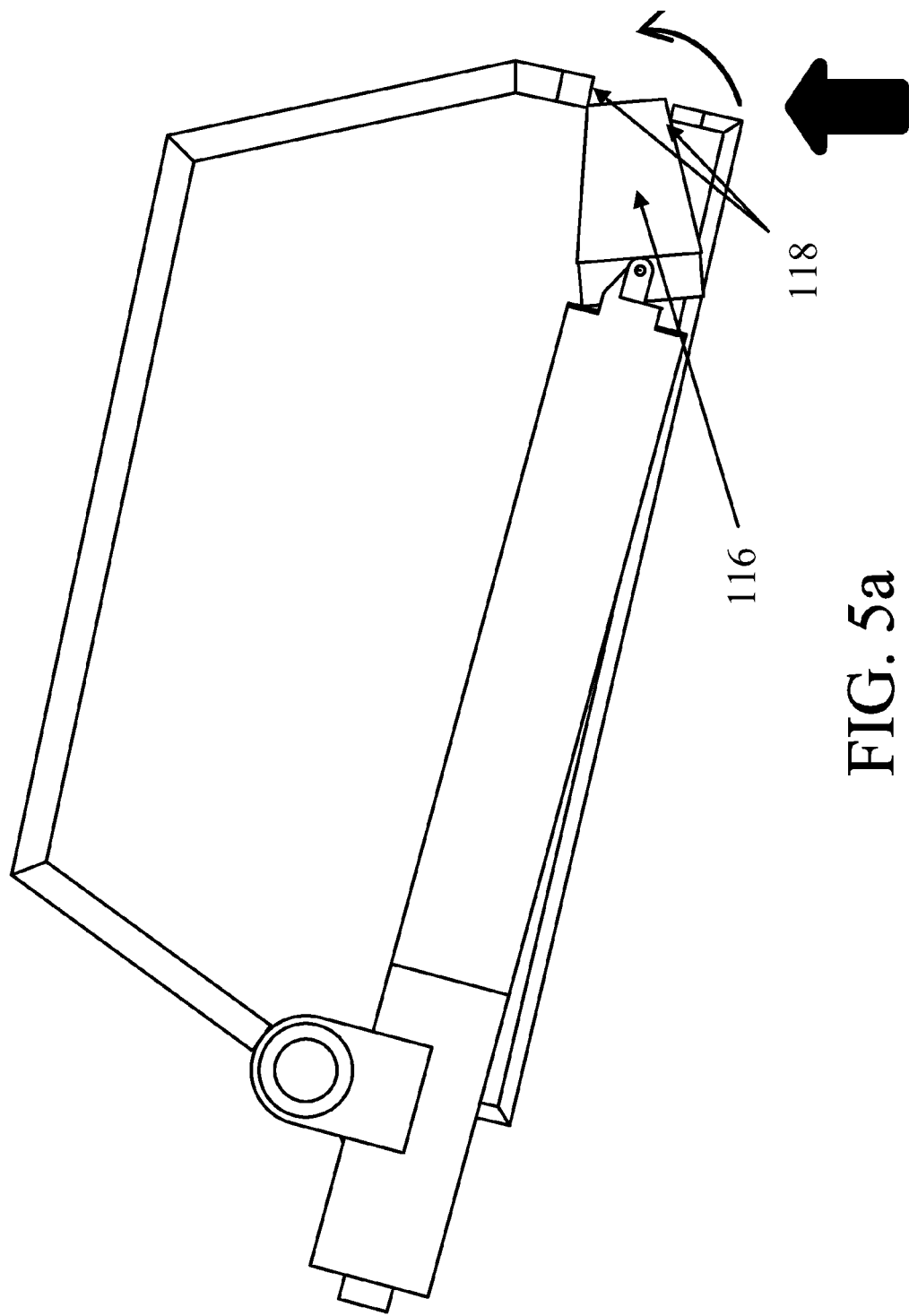
FIG. 5*a* depicts a schematic diagram showing that the handlebar is hit from behind according to the first embodiment of the present invention.
Figure 5B:
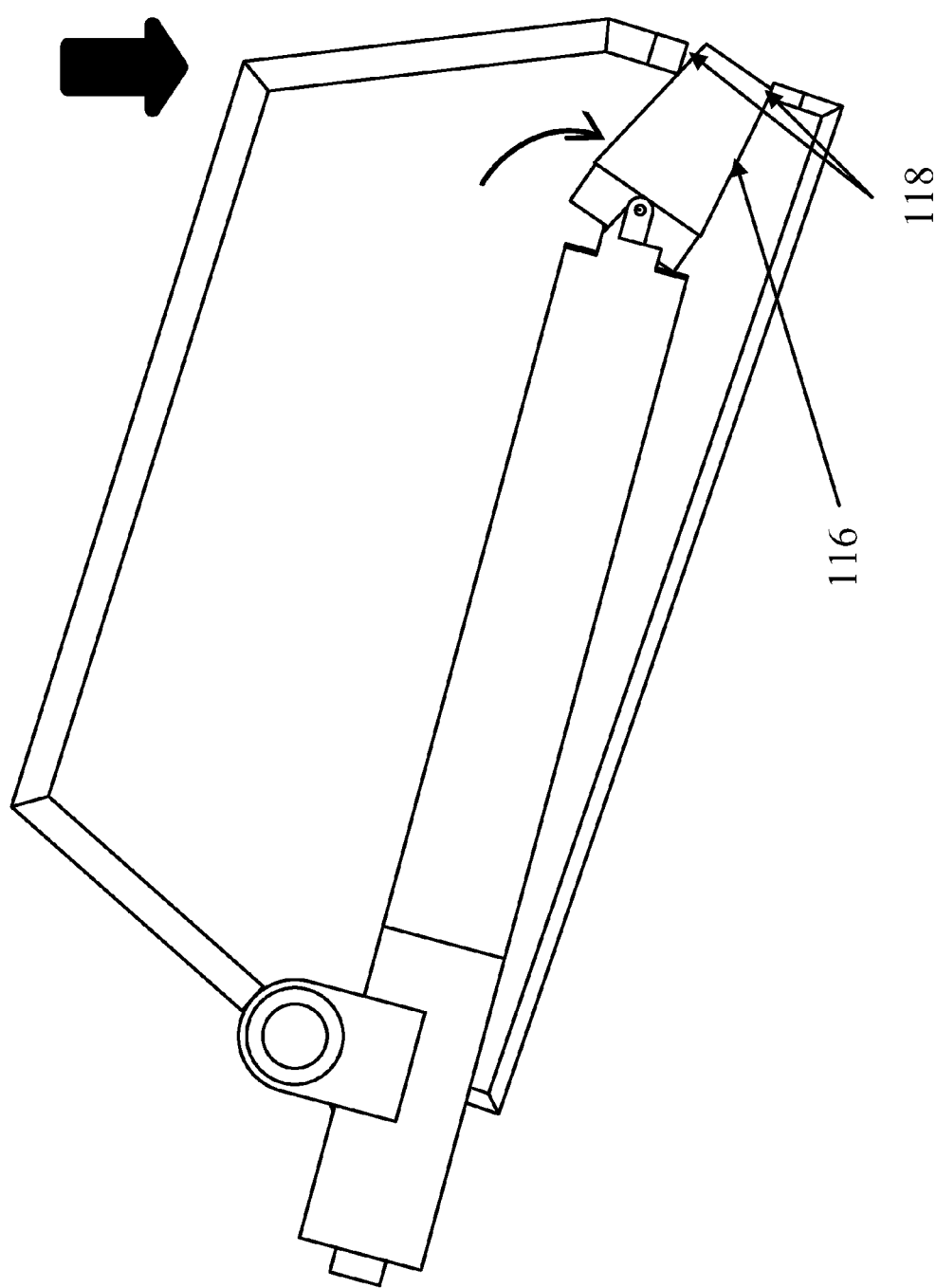
FIG. 5*b* depicts a schematic diagram showing that the handlebar is hit from the front according to the first embodiment of the present invention.

Please refer to FIG. 5a and FIG. 5b. FIG. 5a depicts a schematic diagram showing that the handlebar is hit from behind according to the first embodiment of the present invention. FIG. 5b depicts a schematic diagram showing that the handlebar is hit from the front according to the first embodiment of the present invention. As is well known, an external impact force can occur in many ways. This is the reason why the front guard 110 and the rear guard 112 are installed. The front guard 110 and the rear guard 112 are rotatably pivoted with the head part 100 with the bolt 108. The ends of the front guard 110 and the rear guard 112 can slide in the slide slot 118 of the balance terminal 116. Such design can make the safety device on the steering handle of the present invention react properly no matter how the external force applies to the balance terminal 116 of the handlebar, the front guard 110 or the rear guard 112. The original direction of the direction-control wheel 10 can be maintained and the fall-over of the rider and the wheeled vehicle can be prevented.

As shown in FIG. 5a, when the handlebar is hit from behind as indicated by the black arrow in Figure, the balance terminal 116 is moved forward relative to the wheeled vehicle (miscued and off the default position). As shown in FIG. 5b, when the handlebar is hit at the front as indicated by the black arrow in Figure, the balance terminal 116 is moved backward relative to the wheeled vehicle (same miscued and off the default position).

Figure 6A:
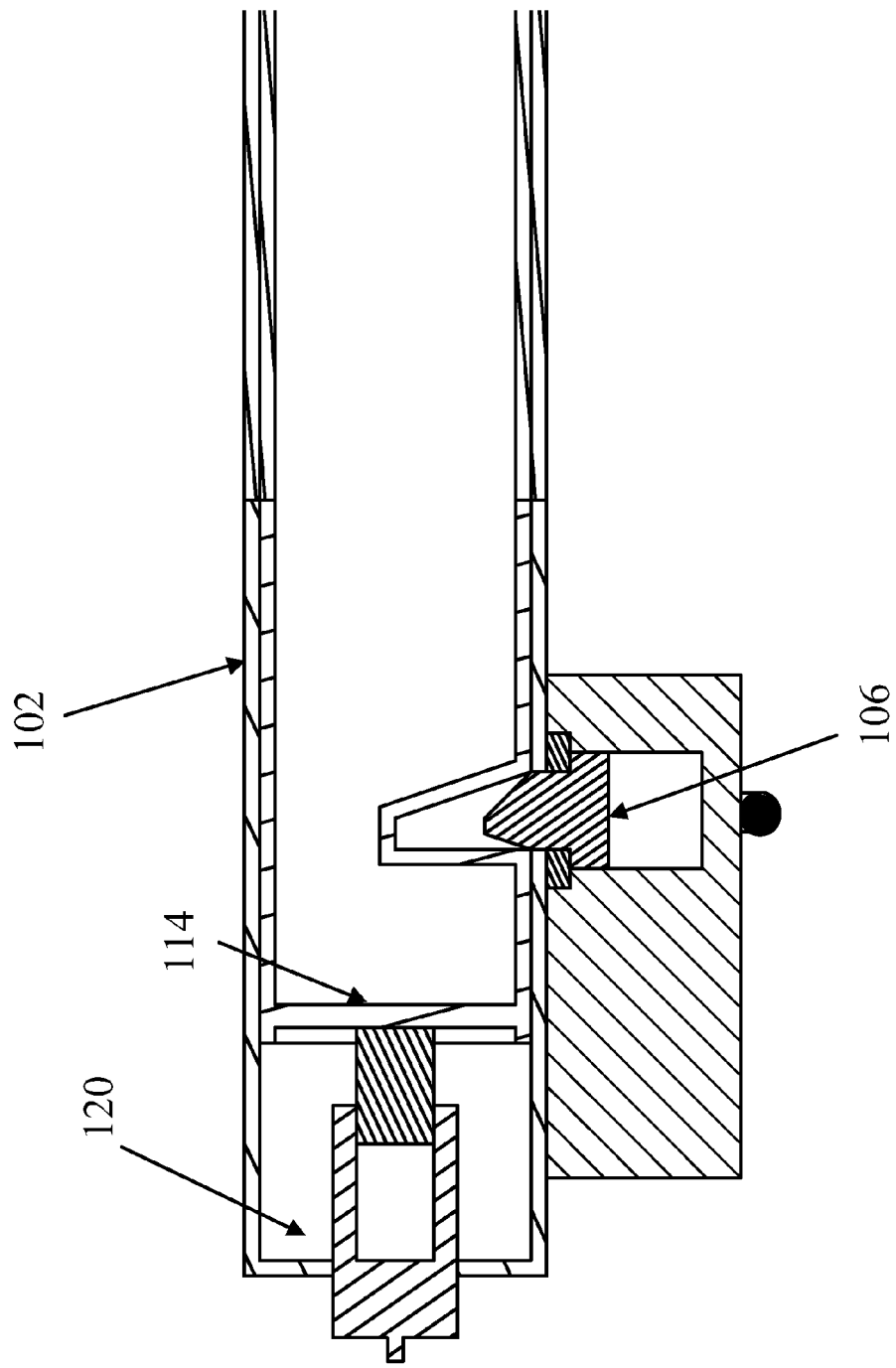
FIG. 6*a* depicts a diagram of the head part, the tenon, the outer bar and the inner tube in normal positions according to the first embodiment of the present invention.
Figure 6B:
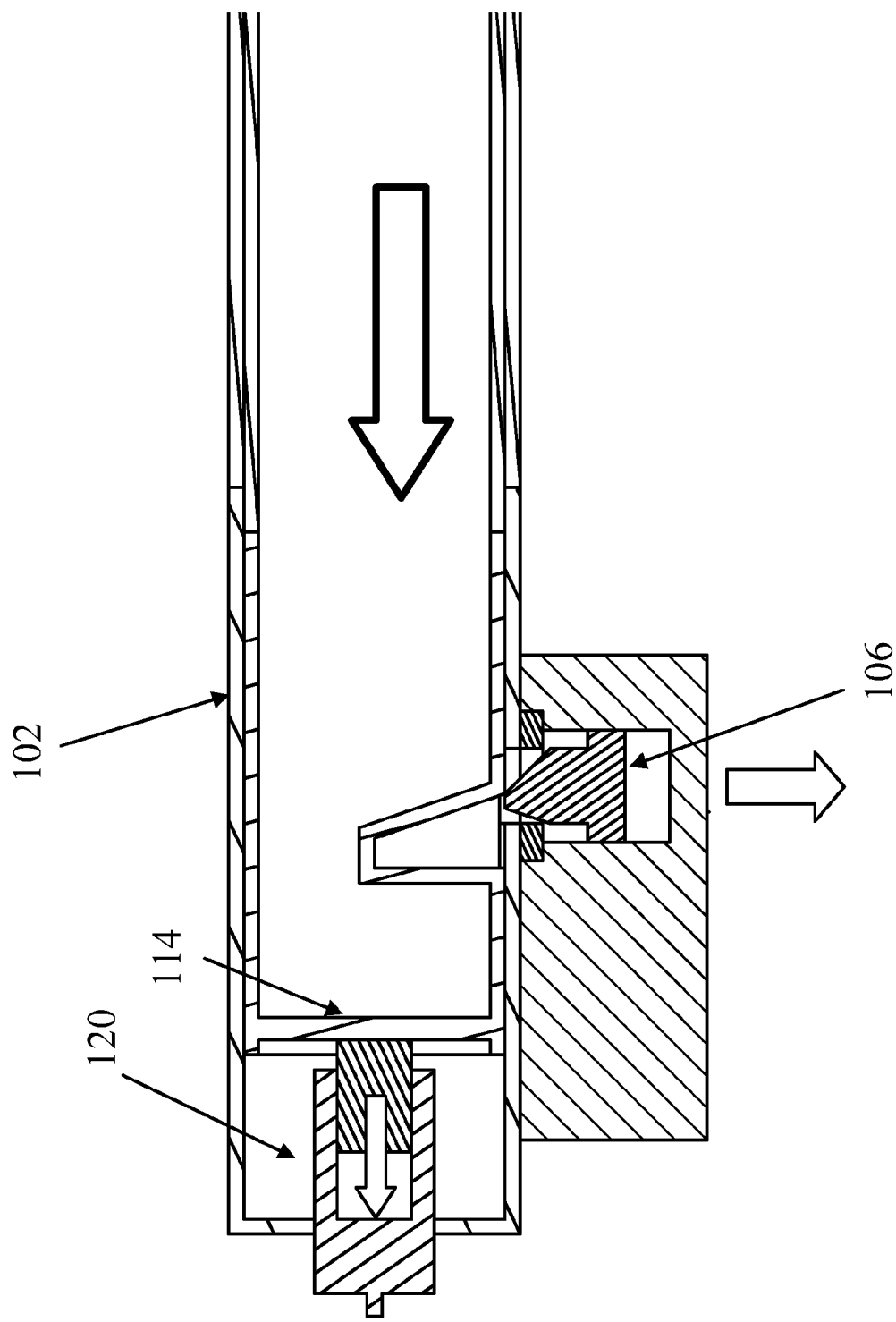
FIG. 6*b* depicts a diagram of the tenon pressed down by the inner tube as the handlebar is hit according to the first embodiment of the present invention.

Please refer to FIG. 6a to FIG. 7b. FIG. 6a depicts a diagram of the head part 100, the tenon 106, the outer bar 102 and the inner tube 114 in normal positions according to the first embodiment of the present invention. The inner tube 114 has a mortise for fitting the tenon 106 of the head part 100. The electrical switch 120 of the hydraulic system of the present invention is in a non-triggered status in FIG. 6a. FIG. 6b depicts a diagram that the tenon 106 is pressed down by the inner tube 114 and the electrical switch 120 is also triggered as the handlebar is hit by an external force as indicated by the black arrow in FIG. 5a or FIG. 5b.

Figure 7A:
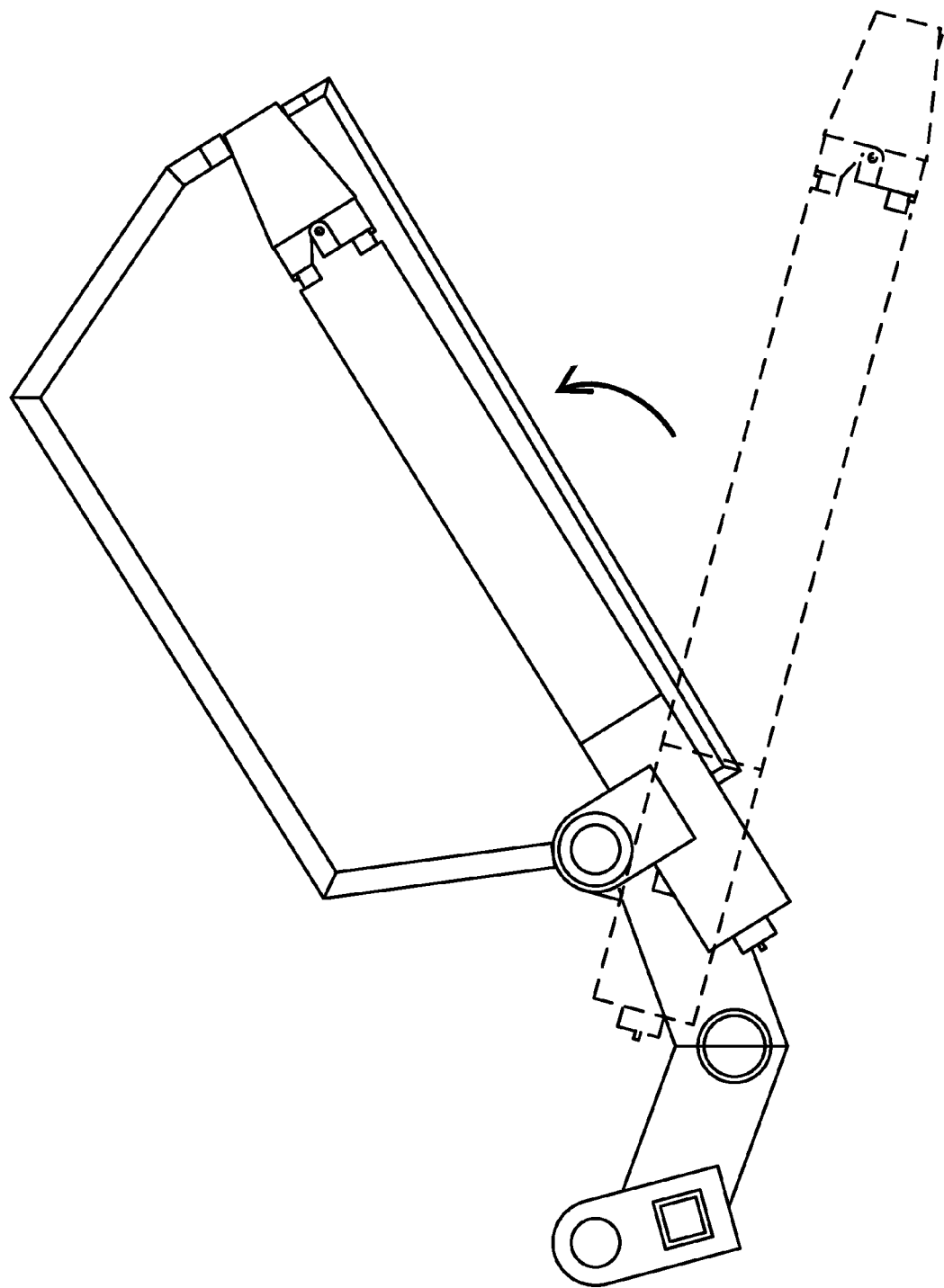
FIG. 7*a* depicts a diagram of the handlebar of the first embodiment rotated forward as it is hit from behind.
Figure 7B:
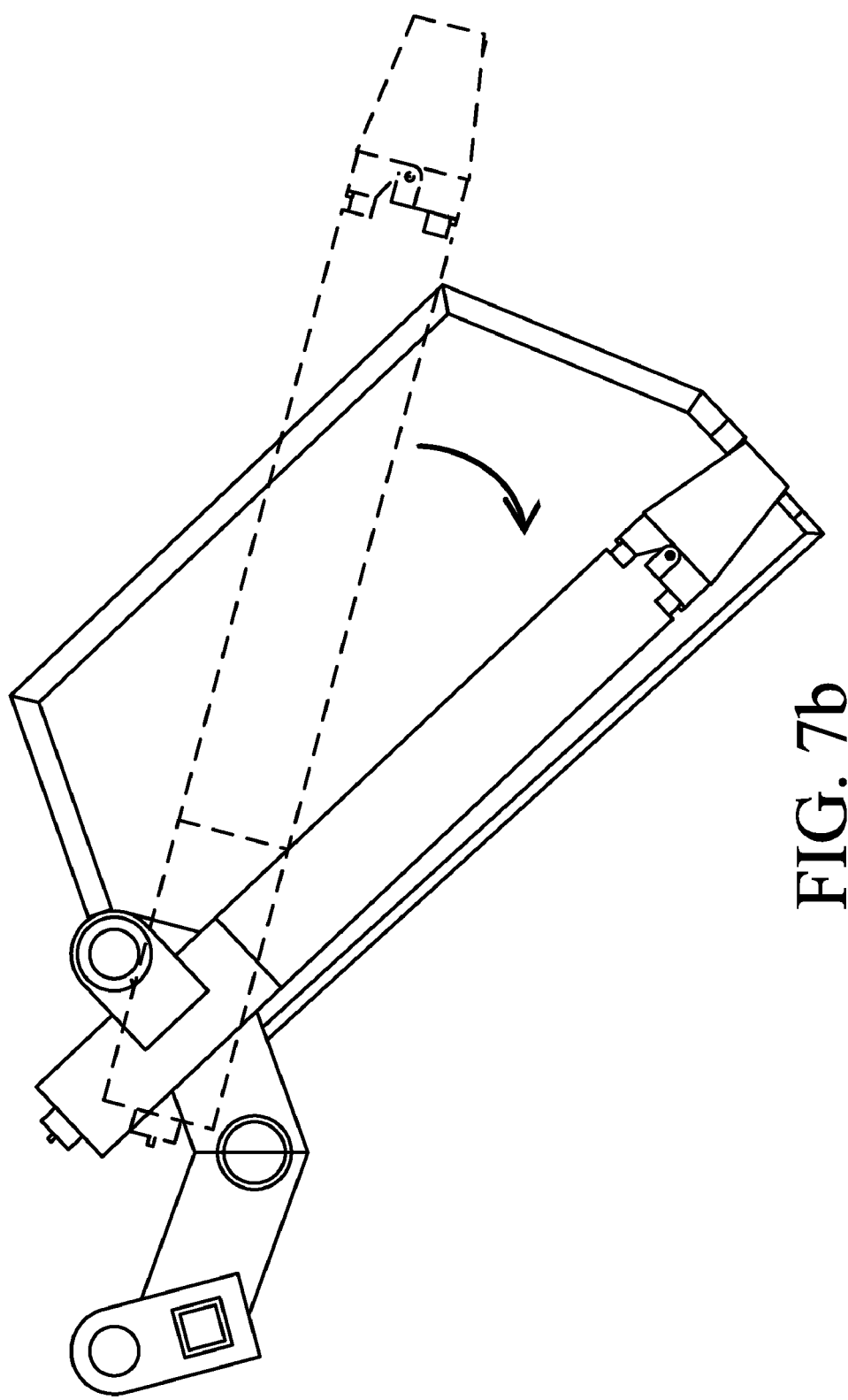
FIG. 7*b* depicts a diagram of the handlebar of the first embodiment rotated backward as it is hit from the front.

Moreover, as the first embodiment shown in FIG. 7a, the handlebar is hit from behind, and then moved forward and pivoted around the bolt 108. For the first embodiment shown in FIG. 7b, the handlebar is hit in the front, and then moved backward and also pivoted around the bolt 108.

Figure 8A:
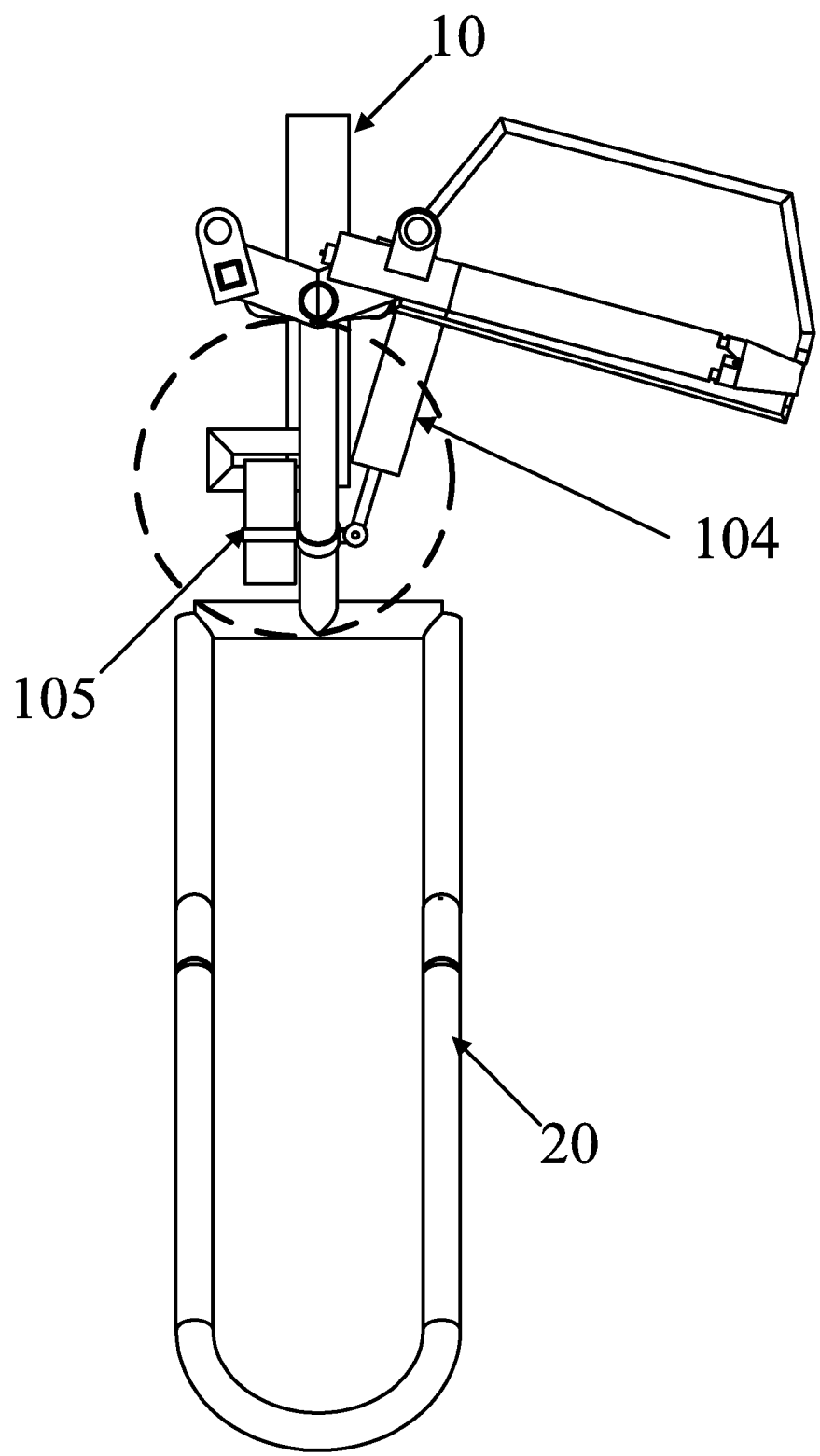
FIGS. 8*a*~8*c* show diagrams that the operation of the hydraulic system does not interfere the normal direction change operation of the steering handle of the first embodiment.
Figure 8B:
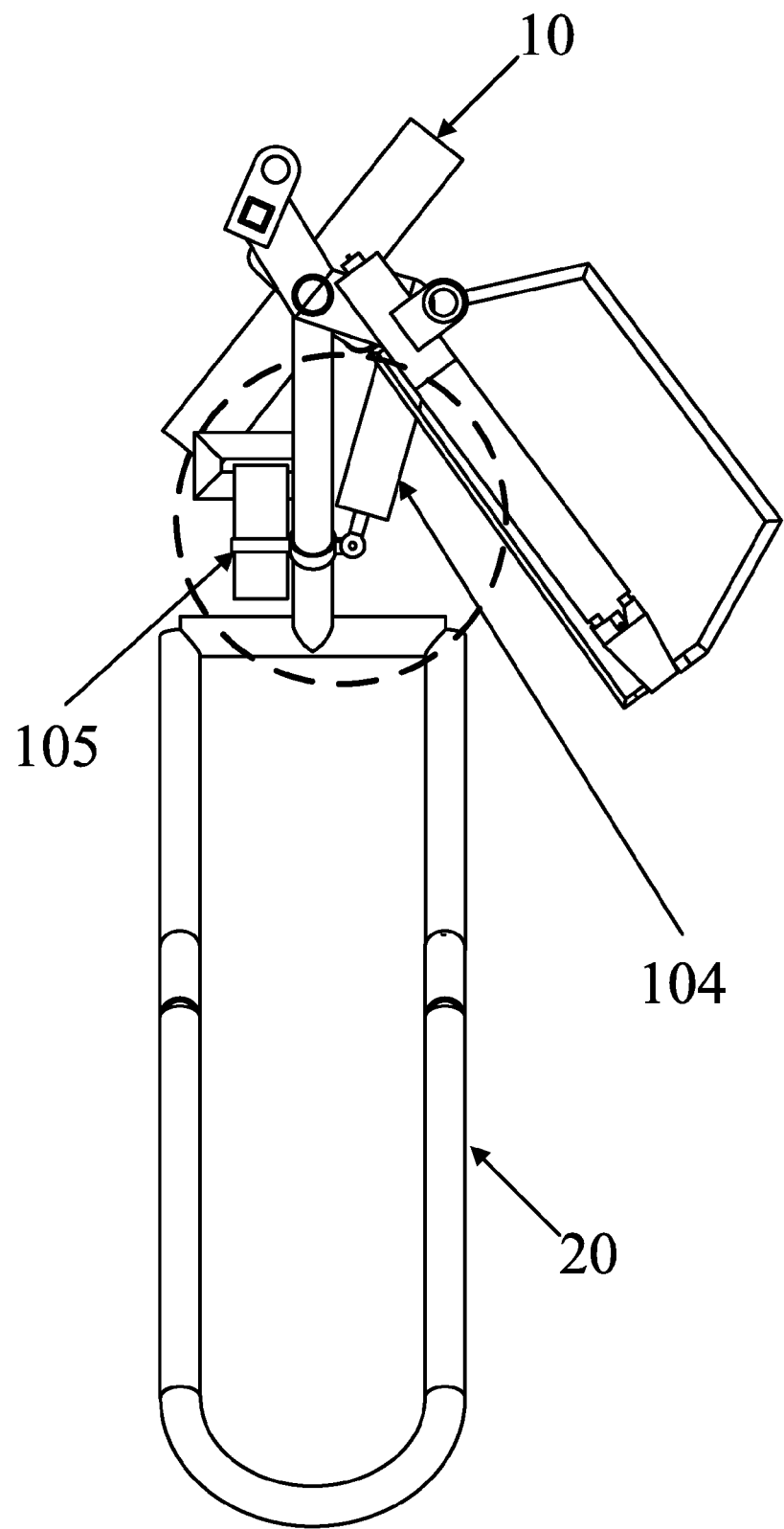
Figure 8C:
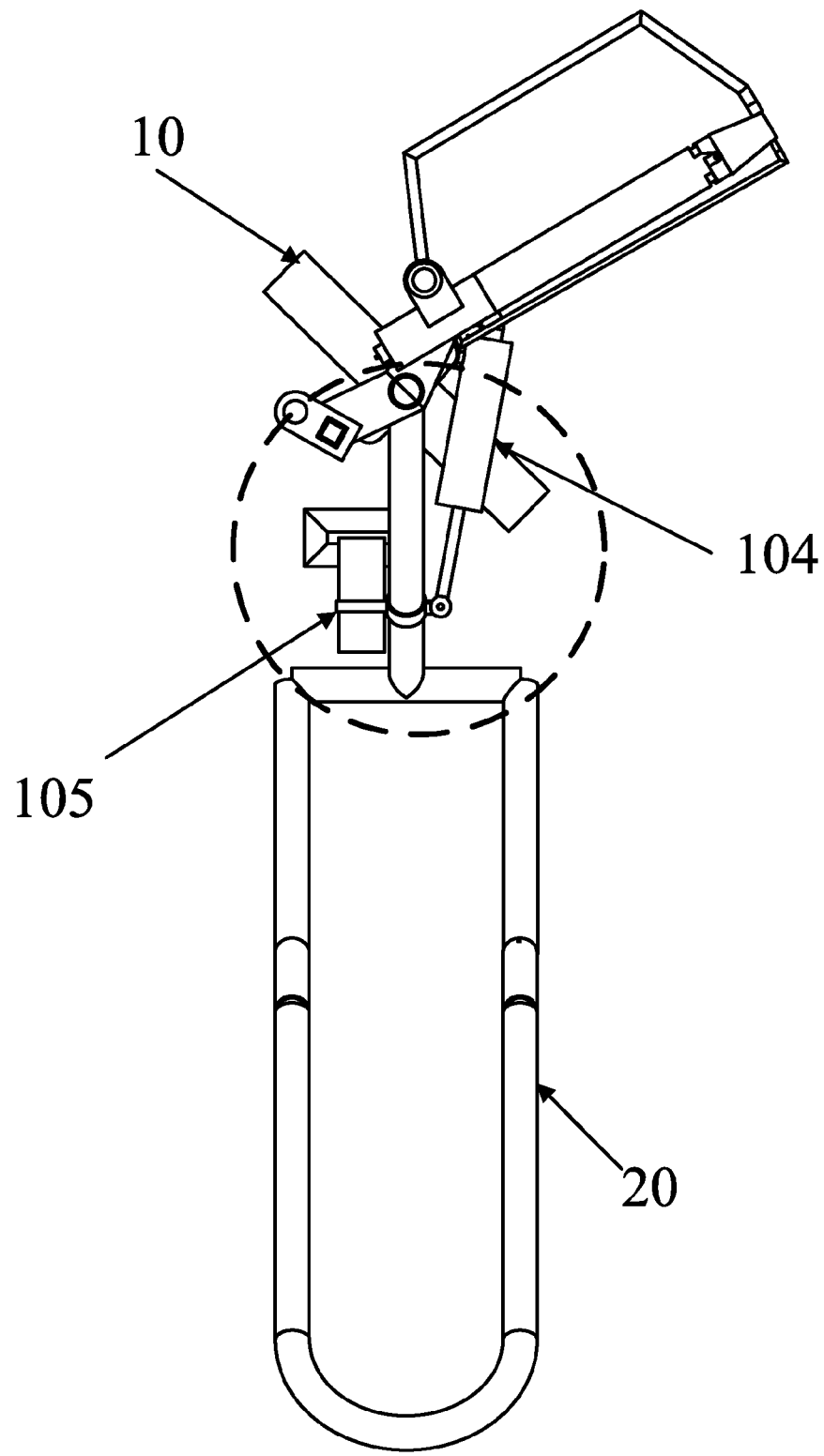

Please refer to FIGS. 8a~8c, which show diagrams that the operation of the hydraulic system does not interfere with the normal direction change operation of the steering handle of the first embodiment. The hydraulic system of the present invention as being a direction maintaining mechanism comprises a hydraulic cylinder 104 and an electrical hydraulic valve 105. The operation of the hydraulic cylinder 104 and the electrical hydraulic valve 105 does not interfere with the normal operation of the direction change of the steering handle. The two ends of the hydraulic cylinder 104 are fixed at the chassis 20 and the head part 100 respectively. In the normal operation of the wheeled vehicle, the head part 100 can drive the direction-control wheel 10 for a direction change. The hydraulic cylinder 104 can be elongated or shortened for coordinating the distance change between the chassis 20 and the head part 100. The oil can flow freely in the flow pipe of the hydraulic cylinder 104 and the electrical hydraulic valve 105. The agility of the normal operation of the steering handle is not affected at all.

Figure 9A:
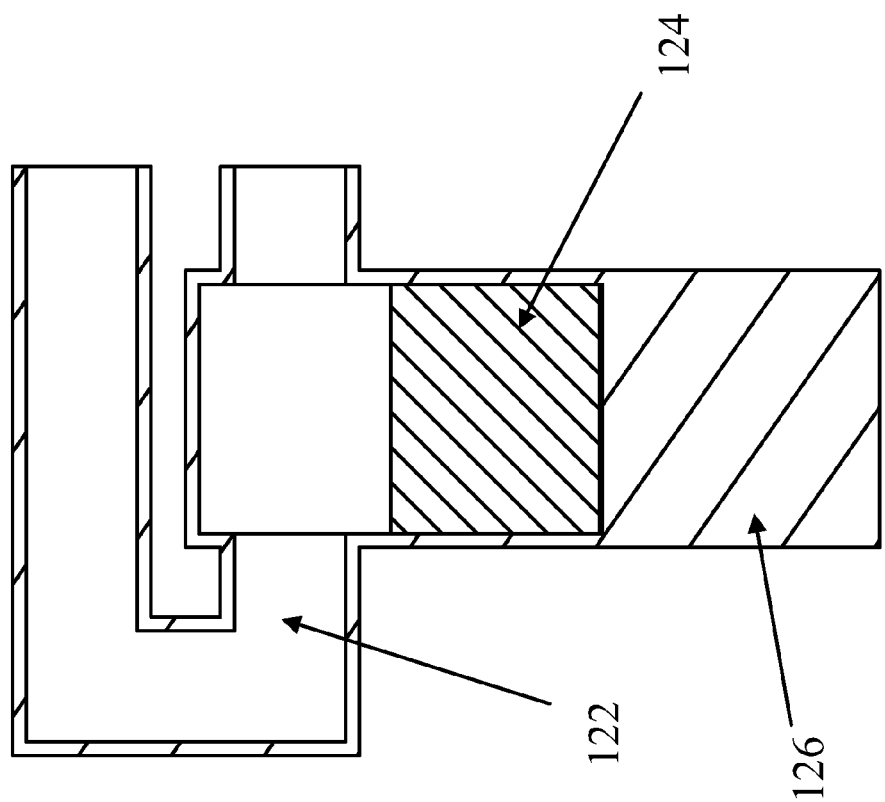
FIG. 9a shows a diagram of a piston of the hydraulic system in the normal position according to the first embodiment of the present invention.
Figure 9B:
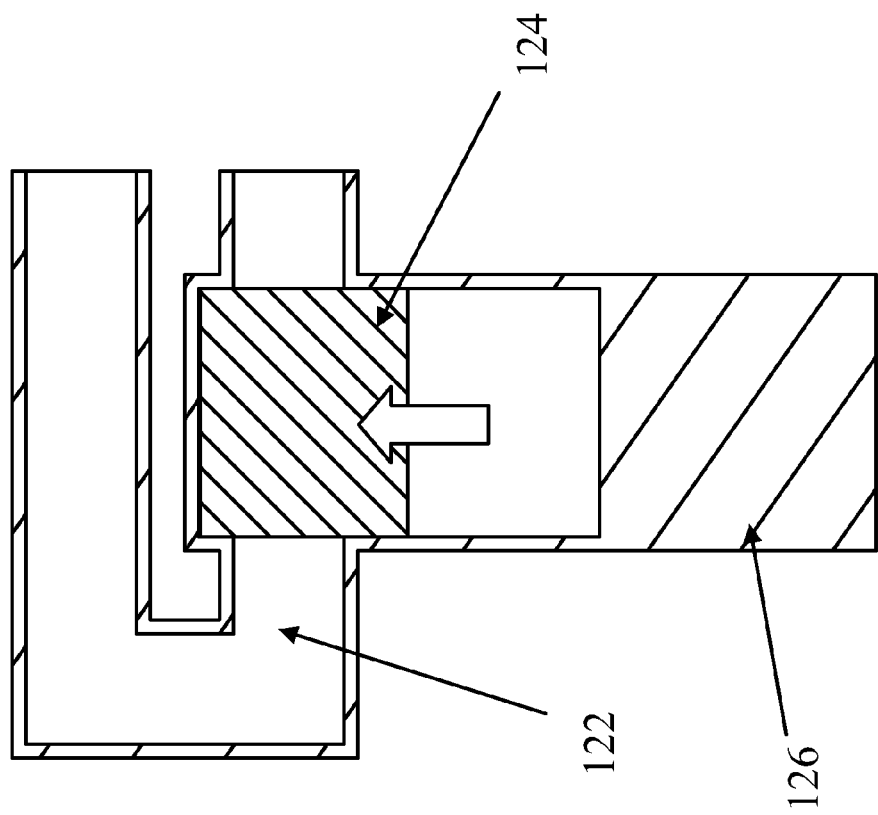
FIG. 9b shows a diagram of a piston of the hydraulic system in an oil flow lock position according to the first embodiment of the present invention.

Please refer to FIG. 9a and FIG. 9b, which show that the piston 124 is in a normal position and in a position to block the oil flow. In FIG. 9a, the piston 124 is in a normal position. As the handlebar is hit, the electrical switch 120 shown in FIG. 4 is triggered by the inner tube 114. The electrical controller 126 receives the signal from the electrical switch 120 and then pushes the piston 124 up to the position to block the oil flow in the flow pipe 122. In this way, the head part and its connected direction-control wheel can not be rotated at that instant and a very short period of time to follow. Therefore, the original direction of the direction-control wheel 10 shown in FIGS. 8a~8c can be maintained at the moment when the handlebar is hit.

Figure 10:
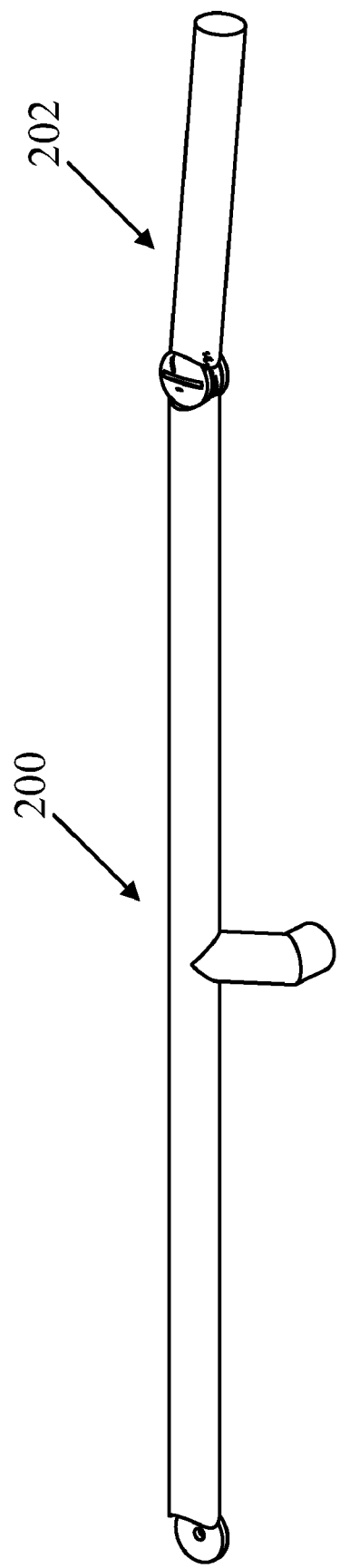
FIG. 10 depicts a diagram of the safety device on the steering handle according to the second embodiment of the present invention.
Figure 11:
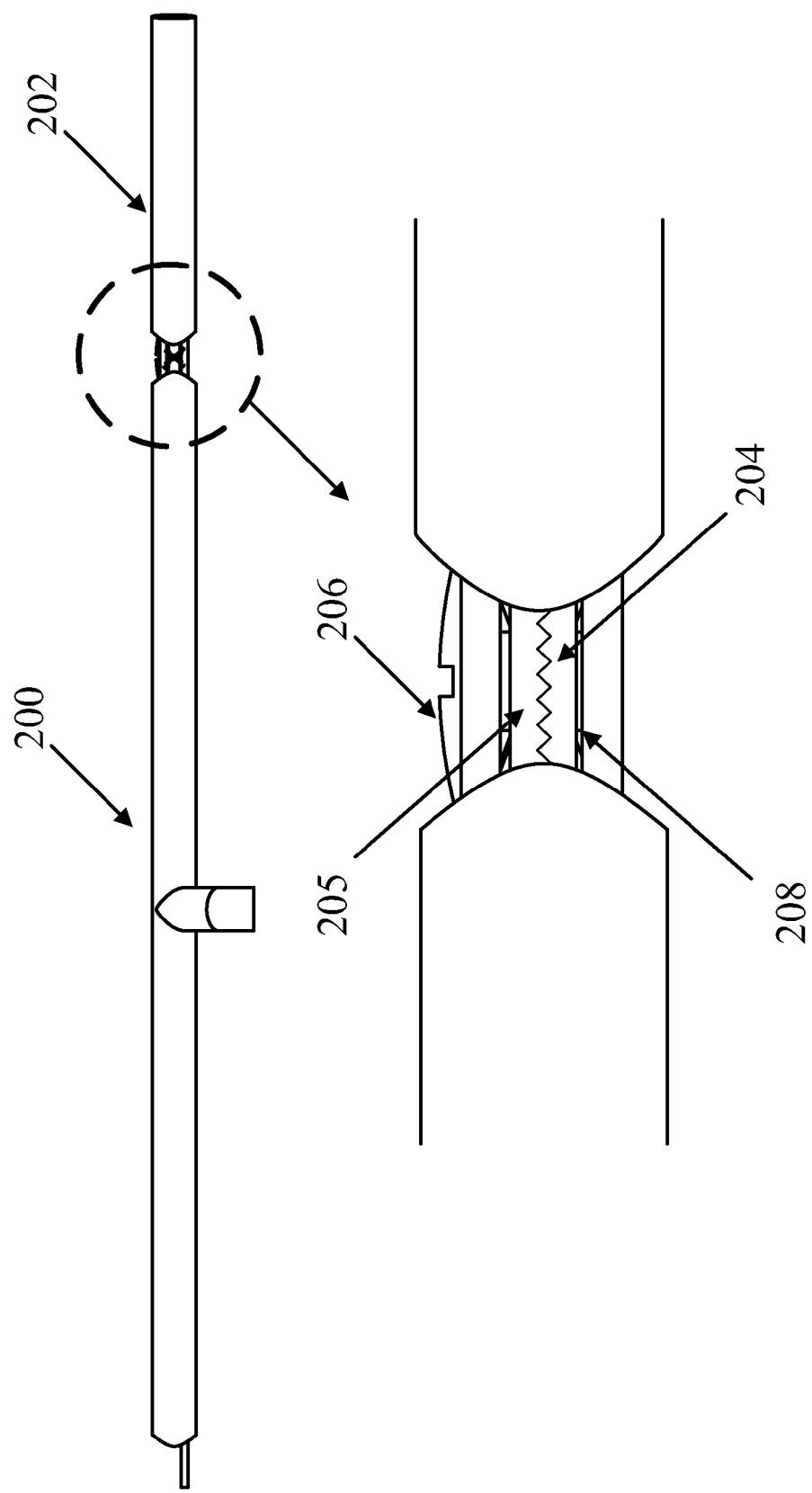
FIG. 11 depicts a diagram of the head part and the handlebar joined together according to the second embodiment of the present invention.
Figure 12:
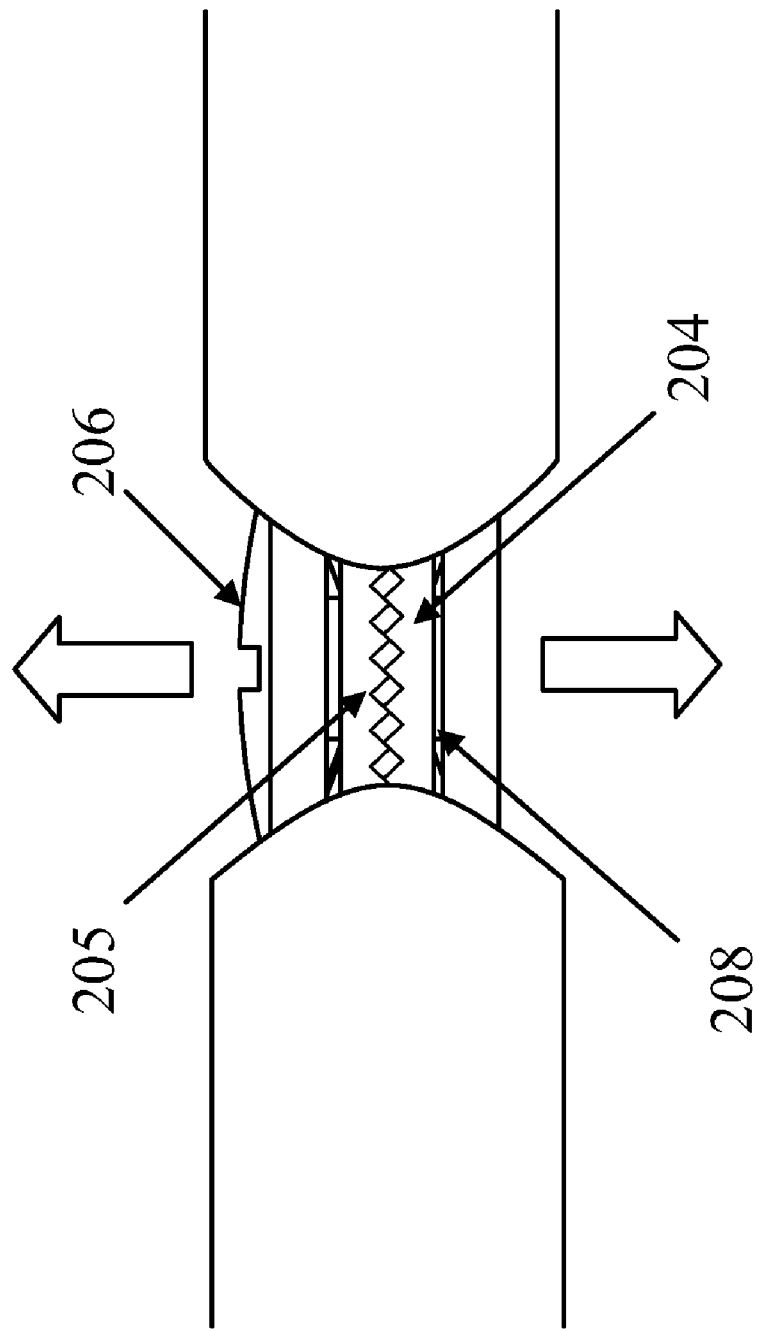
FIG. 12 shows a diagram that the washers with wedge-shaped teeth for connection are disengaged to allow the handlebar to rotate according to the second embodiment of the present invention.

Please refer to FIG. 10 to FIG. 12. FIG. 10 depicts a diagram of the safety device on the steering handle according to the second embodiment of the present invention. The safety device on the steering handle of the second embodiment of the present invention comprises a head part 200, a handlebar 202 and a buffer assembly. The buffer assembly comprises a first washer with wedge-shaped teeth 204 and a second washer with wedge-shaped teeth 205. FIG. 11 depicts a diagram of the head part 200 and the handlebar 202 joined together according to the second embodiment of the present invention. The head part 200 is connected with the chassis of the wheeled vehicle. The first washer with wedge-shaped teeth 204 is placed at one end of the head part 200. The second washer with wedge-shaped teeth 205 is placed at one end of the handlebar 202. The first washer with wedge-shaped teeth 204 and the second washer with wedge-shaped teeth 205 are connected with respective wedge-shaped teeth.

Meanwhile, the head part 200 and the handlebar 202 are clamped together with a screw bolt 206. Moreover, a spring washer 208 is placed between the first washer with wedge-shaped teeth 204 and the head part 200. Similarly, another spring washer (not shown) can also be placed between the second washer with wedge-shaped teeth 205 and the handlebar 202. As shown in FIG. 12, as the handlebar 202 is hit or sideswiped, a huge impact force and torque instantly makes the first washer with wedge-shaped teeth 204 and second washer with wedge-shaped teeth 205 to rotate against each other and in the same time compress the spring washers on their backsides. Then, the connection of the respective wedge-shaped teeth is disengaged to allow the first washer 204 and the second washer 205 to rotate with respect to each other. The handlebar can thus be rotated along with the external hitting force. Immediately after the external hitting force disappears, the first washer 204 and the second washer 205 become engaged again due to the recovery force of the spring washer 208. To restore to its original normal position, the rider only has to loosen the screw bolt 206 and readjust the angle of the handlebar 202. The handlebar 202 can be lined up with the head part 200 and then the rider just needs to fasten the screw bolt 206 afterwards.

Figure 13A:
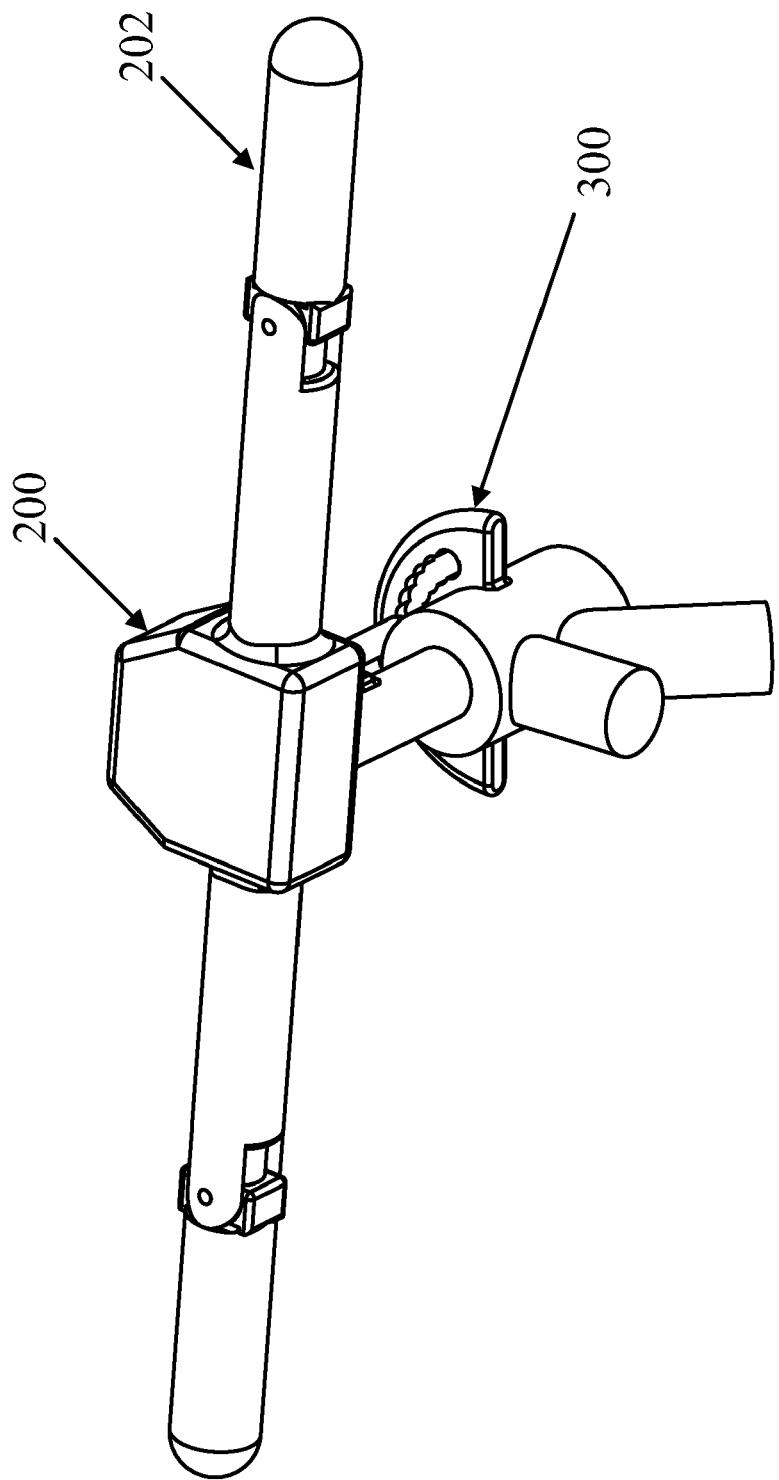
FIG. 13a depicts a diagram of a safety device on a steering handle according to the third embodiment of the present invention.
Figure 13B:
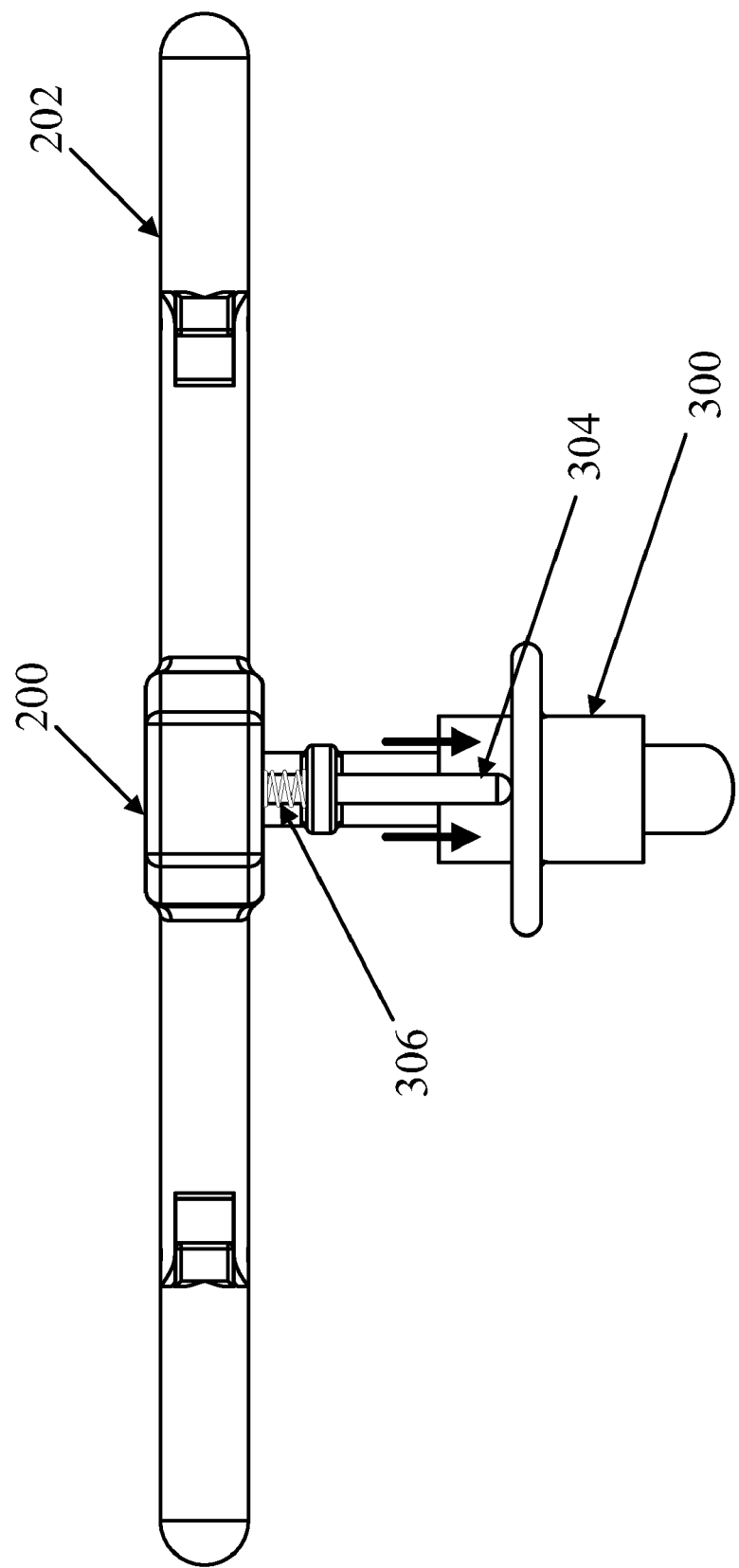
FIG. 13b depicts a front view diagram of the safety device on the steering handle according to the third embodiment of the present invention.
Figure 14:
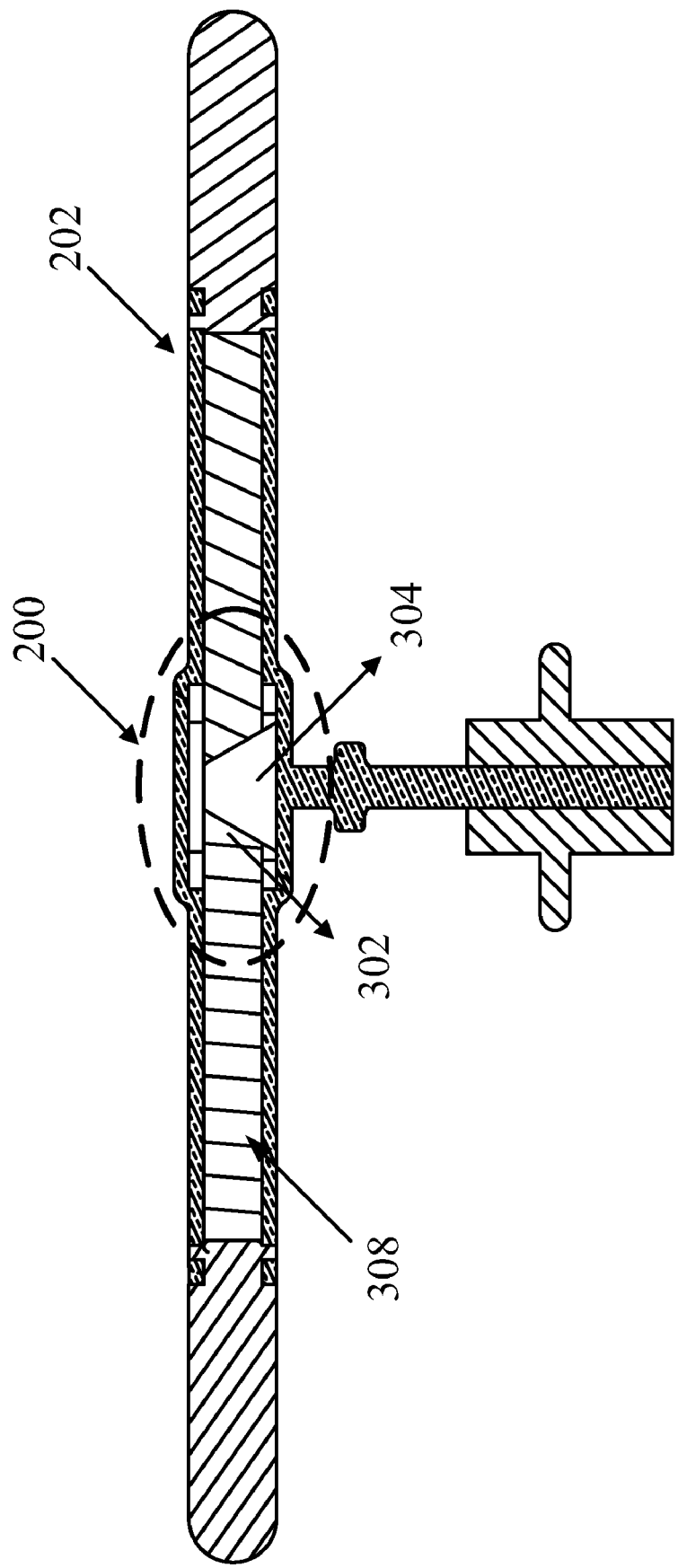
FIG. 14 depicts a cutaway (sectional) rear view diagram of the safety device on the steering handle according to the third embodiment of the present invention.
Figure 15:
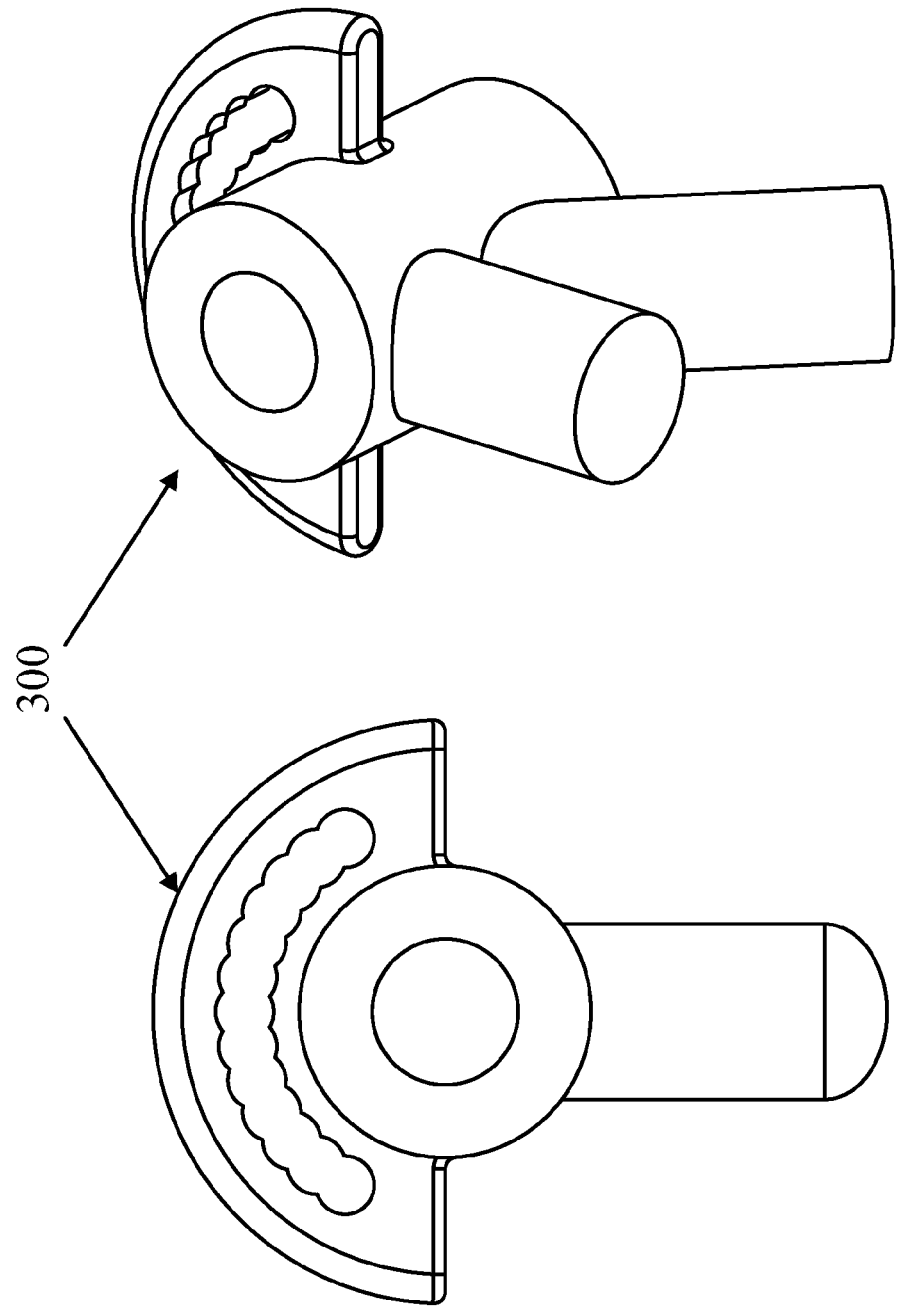
FIG. 15 shows a top view diagram and a stereoscopic diagram of a chassis groove system of the third embodiment according to the present invention.

Please refer to FIG. 13a, FIG. 13b, FIG. 14 and FIG. 15. FIG. 13a depicts a diagram of a safety device on a steering handle according to the third embodiment of the present invention. FIG. 13b depicts a front view diagram according to the third embodiment of the present invention. FIG. 14 depicts a cutaway (sectional) rear view diagram according to the third embodiment of the present invention. The head part 200 comprises an inner tube 308. FIG. 15 shows a top view diagram and a stereoscopic diagram of a chassis groove system of the third embodiment of the present invention. In this third embodiment, the head part 200 and the handlebar 202 are illustrated. However, the head part 100, the outer bar 102 and the inner tube 114 also can be utilized here.

In the third embodiment of the present invention, the buffer assembly can comprise another kind of direction maintaining mechanism. The direction maintaining mechanism of the third embodiment comprises a chassis groove system 300, a frustum 302 and an inserting rod 304. The chassis groove system 300 has a plurality of grooves and can be positioned on the chassis in front of or at the back of the head part 200. The frustum 302 and the inserting rod 304 are placed inside of the head part 200. The inserting rod 304 is positioned aligned with the chassis groove system 300. A tuned recovery spring 306 is placed between the head part 200 and the inserting rod 304. As shown in FIG. 13b, the inserting rod 304 can be pushed down to insert into one of the grooves of the chassis groove system 300 as indicated by arrows in the figure.

Figure 16:
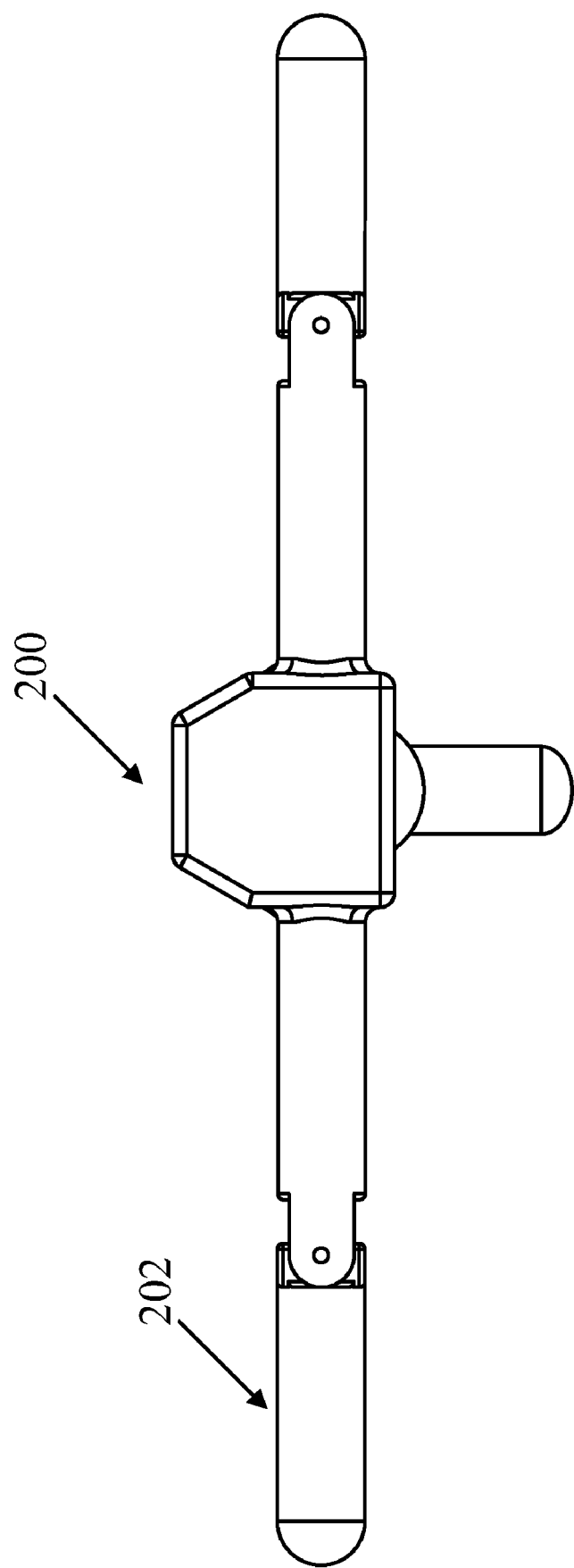
FIG. 16 shows a top view diagram of the safety device on the steering handle of the third embodiment according to the present invention.
Figure 17:
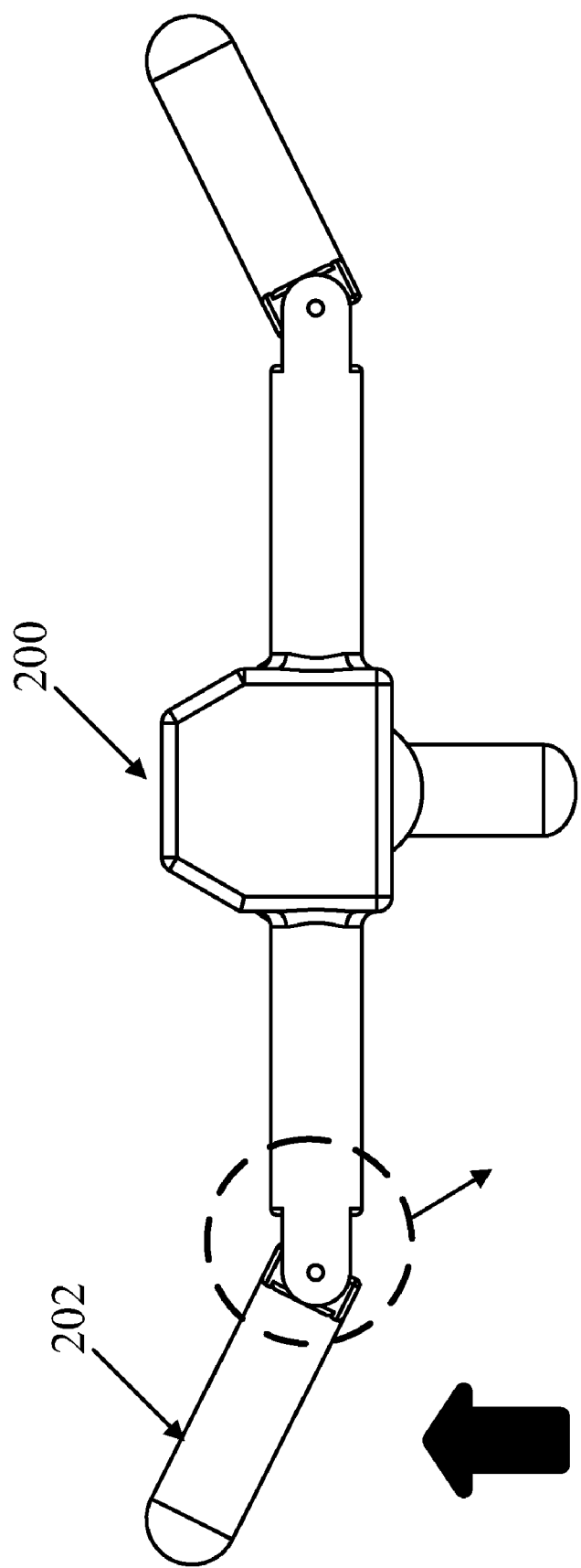
FIG. 17 depicts a diagram of the handlebar of the third embodiment rotated forward as it is hit from behind.
Figure 18:
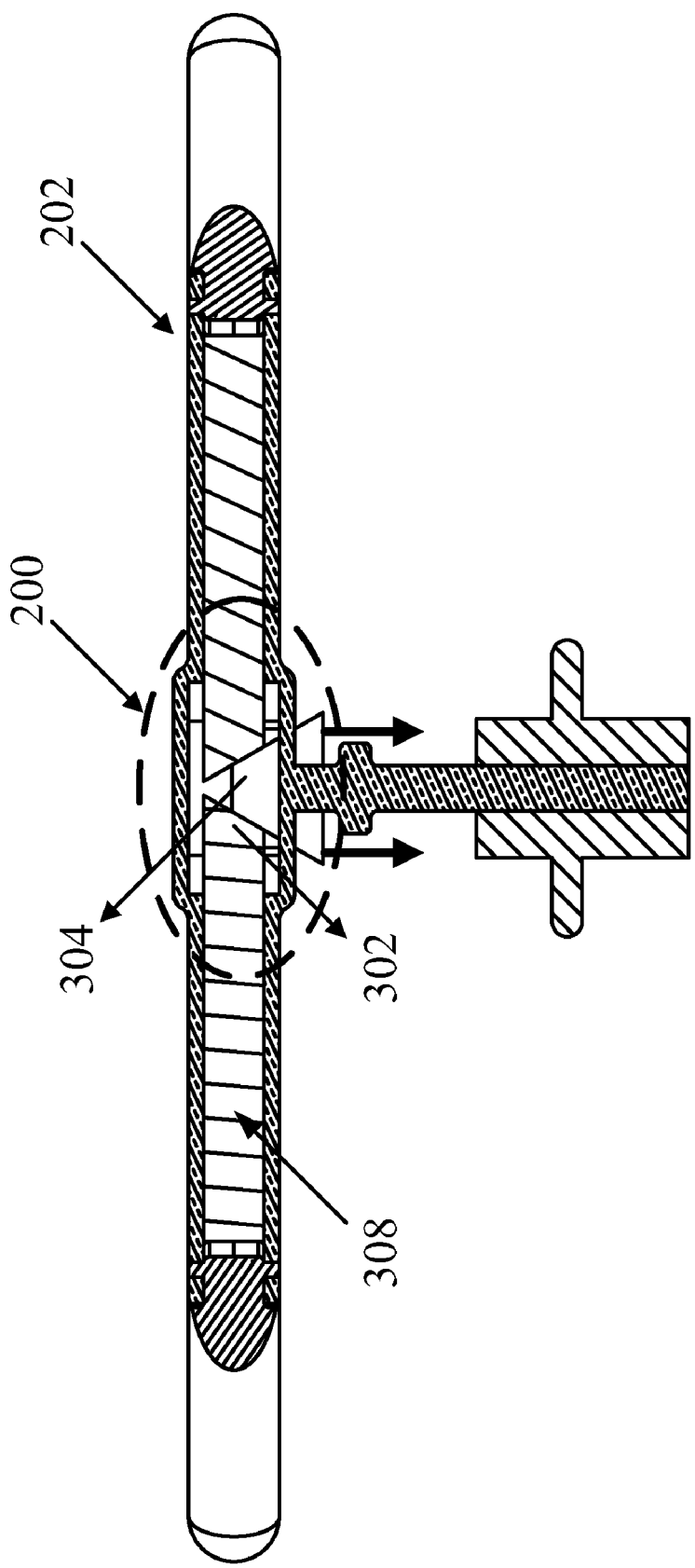
FIG. 18 depicts a cutaway (sectional) rear view diagram that the inner tube pushes and presses down a frustum inside of the head part according to the third embodiment of the present invention.
Figure 19:
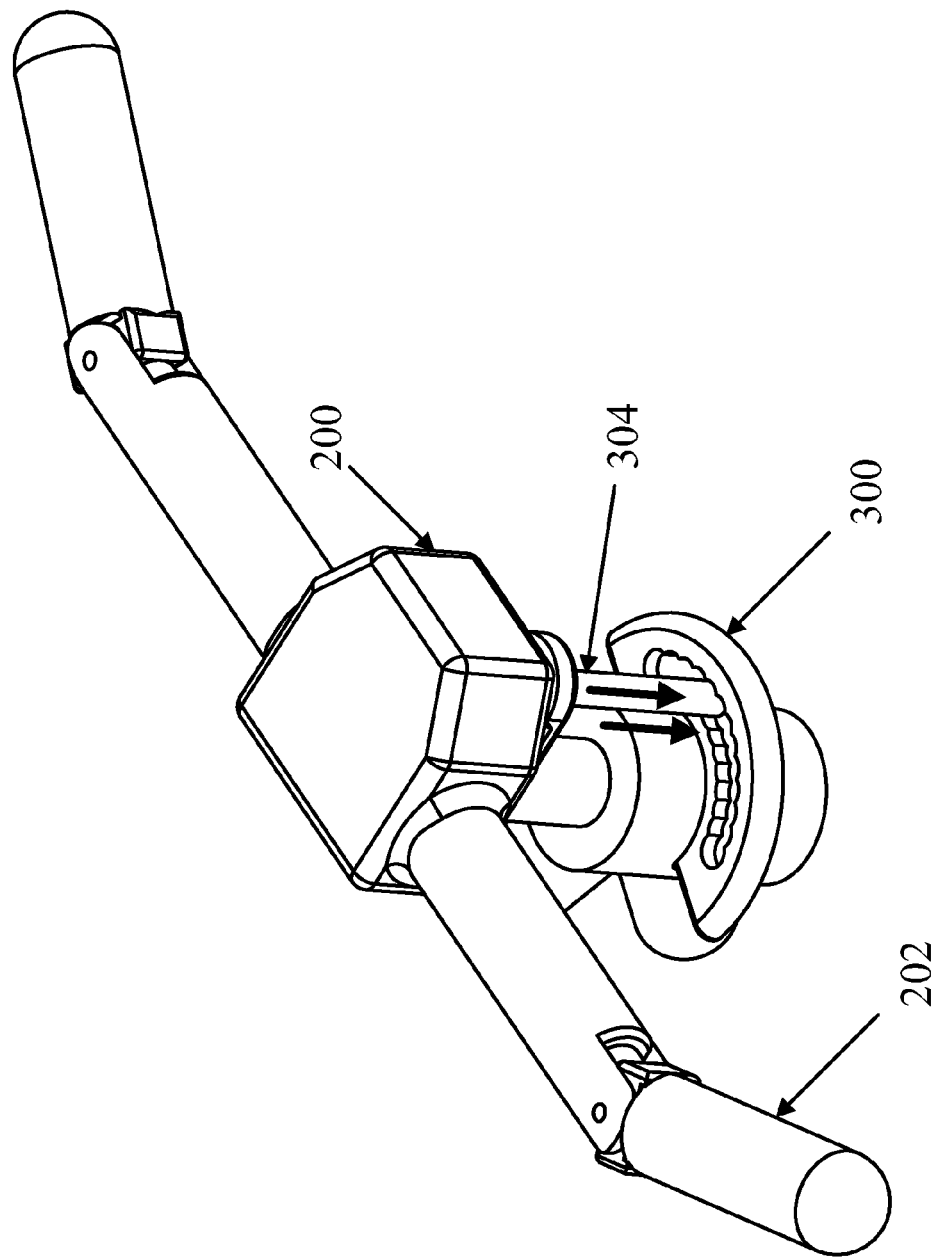
FIG. 19 depicts a diagram of the inserting rod of the wedge inserting into the chassis groove system according to the third embodiment of the present invention.

Please refer to FIG. 16 to FIG. 19. FIG. 16 shows a top view diagram of the safety device on the steering handle of the third embodiment of the present invention. FIG. 17 depicts a diagram of the handlebar 202 of the third embodiment rotated forward as it is hit from behind. FIG. 18 depicts a cutaway (sectional) rear view diagram that the inner tube 308 pushes the frustum 302 of the head part 200 of the third embodiment. FIG. 19 depicts a diagram of the inserting rod 304 inserting into the chassis groove system 300 of the third embodiment. As shown in FIG. 17, as the handlebar 202 is hit or sideswiped from behind and rotates forward, the handlebar pushes the inner tube 308 as shown in FIG. 18. The inner tube 308 then pushes the frustum 302 downward as indicated by the arrows shown in FIG. 18. And then, the inserting rod 304 stretches down into the chassis groove system 300, i.e., inserting into one of the grooves, as indicated by the arrows shown in FIG. 19. At this moment, the head part 200 is fixed with the chassis groove system 300 of the chassis and the head part 200 cannot be rotated. Therefore, the rider of the wheeled vehicle can maintain the original direction of the direction-control wheel at the instant as the handlebar 202 is hit or sideswiped by the external force. Therefore, a fall-over of the rider and the wheeled vehicle following a sudden turn can be prevented. Besides, with the tuned recovery spring 306 placed between the head part 200 and the inserting rod 304, the inserting rod 304 can be withdrawn from the groove of the chassis groove system 300 for the rider to regain the control of the head part 200.

Please notice that the present invention can not only be applied to a two-wheeled vehicle, such as a bicycle or a motorcycle, but also be applied to a three-wheeled or a four-wheeled vehicle. The present invention is adaptable to any vehicle with a steering handle. The present invention can prevent the consequent fall-over of the rider caused by a sideswiping. Therefore, driving safety can be improved further.

As is understood by a person skilled in the art, the foregoing preferred embodiments of the present invention are illustrative rather than limiting of the present invention. It is intended that they cover various modifications and similar arrangements be included within the spirit and scope of the appended claims, the scope of which should be accorded the broadest interpretation so as to encompass all such modifications and similar structures.

What is claimed is:

1. A safety device on a steering handle, positioned on a wheeled vehicle having a direction-control wheel, comprising:
   a head part, connected with a chassis of the wheeled vehicle for driving the direction-control wheel;
   a handlebar, joined to the head part;
   a buffer assembly, allowing the handlebar to rotate when hit by an external impact force and at the same time maintaining the original direction of the direction-control wheel as the handlebar is hit by the external force; and
   a tenon, positioned on the head part and the handlebar further comprises an outer bar and an inner tube, wherein the handlebar is engaged with the head part by the tenon for controlling the direction-control wheel of the wheeled vehicle,
   and wherein the buffer assembly further comprises a balance terminal, positioned at the other end of the outer bar joined to the head part and joined to the outer bar with a bolt, wherein the balance terminal is employed to push the inner tube for disengaging the tenon to rotate the handlebar.

2. The safety device on the steering handle of claim 1, wherein the buffer assembly further comprises a front guard positioned in the front of the handlebar, wherein one end of the front guard is joined to the balance terminal and the other end of the front guard is joined to the head part with a bolt for pushing the inner tube as the front guard is hit.

3. The safety device on the steering handle of claim 1, wherein the buffer assembly further comprises a rear guard positioned at the back of the handlebar, wherein one end of the rear guard joins to the balance terminal and the other end of the rear guard is joined to the head part with a bolt to push the inner tube as the rear guard is hit.

4. The safety device on the steering handle of claim 1, wherein the buffer assembly further comprises a direction maintaining mechanism for maintaining the original direction of the direction-control wheel as the balance terminal is hit and the handlebar is rotated.

5. The safety device on the steering handle of claim 4, wherein the direction maintaining mechanism is a hydraulic system positioned between the head part and the chassis.

6. The safety device on the steering handle of claim 5, wherein the hydraulic system further comprises a hydraulic cylinder and an electrical hydraulic valve.

7. The safety device on the steering handle of claim 6, wherein the electrical hydraulic valve further comprises a flow pipe, a piston and an electrical switch.

8. The safety device on the steering handle of claim 7, wherein the electrical switch is positioned at the end of the handlebar joined to the head part, wherein the inner tube triggers the electrical switch to drive the piston to block oil in the flow pipe for maintaining the original direction of the direction-control wheel as the balance terminal is hit.

9. The safety device on the steering handle of claim 8, wherein the piston returns to a normal position to allow the oil flow freely in the flow pipe after the external force disappears.

10. The safety device on the steering handle of claim 1, wherein the balance terminal further comprises a slide slot for containing the ends of the front guard and the rear guard which are joined to the balance terminal.

\* \* \* \* \*